(12) United States Patent
Figa

(10) Patent No.: US 11,975,957 B2
(45) Date of Patent: *May 7, 2024

(54) APPARATUS AND METHOD FOR GRIPPING A CONTAINER

(71) Applicant: Romek Figa, Hanover, MA (US)

(72) Inventor: Romek Figa, Hanover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,064

(22) Filed: Jul. 18, 2022

(65) Prior Publication Data

US 2022/0348451 A1    Nov. 3, 2022

Related U.S. Application Data

(63) Continuation of application No. 17/014,529, filed on Sep. 8, 2020, now Pat. No. 11,472,686.

(60) Provisional application No. 62/913,456, filed on Oct. 10, 2019, provisional application No. 62/905,693, filed on Sep. 25, 2019.

(51) Int. Cl.
 *B67B 7/18* (2006.01)
 *B67B 7/14* (2006.01)

(52) U.S. Cl.
 CPC . *B67B 7/18* (2013.01); *B67B 7/14* (2013.01)

(58) Field of Classification Search
 CPC .................................. B67B 7/18; B67B 7/14
 USPC .......................................................... 81/3.42
 See application file for complete search history.

(56) References Cited

U.S. PATENT DOCUMENTS

| | | | |
|---|---|---|---|
| 82,627 A * | 9/1868 | Munger | B44B 3/065 |
| | | | 269/232 |
| 515,983 A * | 3/1894 | Winchester | B67B 7/34 |
| | | | 279/71 |
| 630,734 A | 8/1898 | Oothout | |
| 648,763 A | 5/1900 | La Barge | |
| 710,606 A | 10/1902 | Pagett | |
| 826,294 A * | 7/1906 | Waldschmidt | A47B 81/007 |
| | | | 362/396 |
| 936,927 A | 10/1909 | McCallum | |
| 1,227,738 A | 5/1917 | Bellis et al. | |
| 1,394,388 A | 10/1921 | Wisenberg et al. | |
| 1,424,607 A * | 8/1922 | Wisenberg | B67B 7/18 |
| | | | 81/3.39 |
| 1,456,525 A | 5/1923 | West | |
| 1,781,997 A | 11/1930 | Berezowski | |

(Continued)

FOREIGN PATENT DOCUMENTS

GB    2 227 968    8/1990

OTHER PUBLICATIONS

International Searching Authority/US: International Search Report and Written Opinion, Application No. PCT/US2017/023745, dated Jul. 7, 2019, 9 pages.

(Continued)

*Primary Examiner* — Hadi Shakeri
(74) *Attorney, Agent, or Firm* — Sunstein LLP

(57) ABSTRACT

An apparatus for grasping a jar and aiding in lid opening includes a base element that may be placed on a surface, and a top housing that is rotatably secured to the base element. The top housing includes a raised outer periphery having at least one recess extending at least partially through the raised outer periphery, each recess allowing an increased maximum outward movement of a corresponding movable jaw member compared to a raised outer periphery lacking the recess.

19 Claims, 29 Drawing Sheets

(56) References Cited

U.S. PATENT DOCUMENTS

| | | | |
|---|---|---|---|
| 1,912,500 A | | 6/1933 | Rutledge |
| 2,094,225 A | * | 9/1937 | Tuttle .................. B23B 5/163 |
| | | | 409/185 |
| 2,569,239 A | | 9/1951 | Holmen |
| 2,732,740 A | | 1/1956 | Holmen |
| 2,977,128 A | * | 3/1961 | Judelson ........... B23B 31/16012 |
| | | | 279/123 |
| 3,008,618 A | | 11/1961 | Watts et al. |
| 3,891,171 A | | 6/1975 | Samuelian et al. |
| 4,102,226 A | | 7/1978 | McGuire |
| 4,222,577 A | | 9/1980 | Giffin |
| 4,836,482 A | | 6/1989 | Sokol |
| 5,129,715 A | | 7/1992 | Maynard, Jr. |
| 5,209,142 A | | 5/1993 | Dickson |
| 5,348,276 A | | 9/1994 | Blacker |
| 5,450,690 A | | 9/1995 | Elsea |
| 6,205,888 B1 | | 3/2001 | Laudani |
| 6,425,305 B2 | | 7/2002 | Gasparre |
| 7,100,473 B2 | | 9/2006 | Hefti et al. |
| 7,395,775 B2 | | 7/2008 | LaScala |
| 8,820,548 B2 | * | 9/2014 | Wilson .................. A47B 13/14 |
| | | | 248/229.15 |
| 10,464,794 B2 | | 11/2019 | Figa |
| 2002/0185800 A1 | | 12/2002 | Duncan |
| 2005/0229750 A1 | * | 10/2005 | Duke ...................... B67B 7/18 |
| | | | 81/3.4 |
| 2011/0061497 A1 | * | 3/2011 | Jedrzejewski ........... B67B 7/18 |
| | | | 81/3.4 |
| 2017/0283231 A1 | | 10/2017 | Figa |
| 2017/0284596 A1 | * | 10/2017 | Figa ........................ F16B 2/10 |
| 2020/0048062 A1 | | 2/2020 | Figa |

OTHER PUBLICATIONS

Kuhn Rikon: "The Gripper Jar Opener", from kuhnrikonshop.com website, web page dated Apr. 21, 2016, web page downloaded Aug. 29, 2020.

WantitALL: Search Results for Jar Opener showing various types of jar openers, from wantitall.co.za website, web page downloaded Aug. 29, 2020.

* cited by examiner

APPARATUS AND METHOD FOR GRIPPING A CONTAINER

CROSS-REFERENCE TO RELATED APPLICATION(S)

This patent application is a continuation of U.S. patent application Ser. No. 17/014,529 entitled APPARATUS AND METHOD FOR GRIPPING A CONTAINER filed Sep. 8, 2020, which claims the benefit of United Stated Provisional Patent Application No. 62/905,693 entitled APPARATUS AND METHOD FOR GRIPPING A CONTAINER filed Sep. 25, 2019 and claims the benefit of United Stated Provisional Patent Application No. 62/913,456 entitled APPARATUS AND METHOD FOR GRIPPING A CONTAINER filed Oct. 10, 2019, each of which is hereby incorporated herein by reference in its entirety.

The subject matter of this patent application is related to the subject matter of the following commonly-owned patent applications, each of which is hereby incorporated herein by reference in its entirety:

U.S. patent application Ser. No. 15/296,479 entitled APPARATUS AND METHOD FOR GRIPPING A CONTAINER DURING LID OPENING filed Oct. 18, 2016; and U.S. patent application Ser. No. 15/296,502 entitled APPARATUS AND METHOD FOR GRIPPING A CONTAINER FOR LID OPENING filed Oct. 18, 2016.

FIELD OF THE INVENTION

The present invention relates to opening container lids, and more particularly to devices and methods that grasp a container during lid opening.

BACKGROUND OF THE INVENTION

Many food products are packaged, shipped and purchased in glass or plastic jars with a screw-on lid that needs to be removed in order to access the contents of the jar. In order to maintain the freshness and cleanliness of the product within the container, the lids are often times thoroughly tightened and sometimes vacuum sealed. This, in turn, makes the lids difficult to remove. The struggle to remove the lid is greater for those individuals suffering from arthritis or dexterity issues, and the task of holding the container in one hand and twisting off the very tight lid becomes very difficult if not nearly impossible.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

For purposes of this description and accompanying claims, a "container" can be anything to be secured in the container gripping apparatus, such as, for example, a jar, bottle, can, etc. A container may, but is not required to, have a removable or openable lid, such as, for example, a screw-off or twist-off lid (e.g., a jar lid), a pop-off lid (e.g., a soda bottle cap), a pry-off lid (e.g., a paint can lid), a pull-tab or pop-top opener (e.g., an aluminum can lid), etc.

U.S. patent application Ser. No. 15/296,479 entitled APPARATUS AND METHOD FOR GRIPPING A CONTAINER DURING LID OPENING filed Oct. 18, 2016, which was incorporated by reference above, describes a container gripping apparatus having a top housing that is rotatable relative to a base for moving one or more jaw members to engage or disengage with the container, where the top housing has a raised outer periphery that provides a surface by which the user may grab and rotate the top housing. Embodiments of the present invention provide an improved container gripping apparatus that utilizes a specially-configured top housing in which the raised outer periphery includes recesses positioned to allow the movable jaw member(s) a greater outward range of motion and to provide enhanced grip locations for the user. For a given raised outer periphery size, the specially-configured top housing can allow the container gripping apparatus to accommodate a larger container. Alternatively, for a given jaw member range of motion (and hence a given maximum accommodated container size), the specially-configured top housing can allow the use of a smaller raised outer periphery diameter (and hence a reduced-size container gripping apparatus that can be configured to take up less space on a counter or in a drawer). In any case, the recesses in the specially-configured raised outer periphery can provide for enhanced gripping by the user such as by accommodating the user's thumbs/fingers to provide additional leverage for rotating the top housing.

Figure 1:
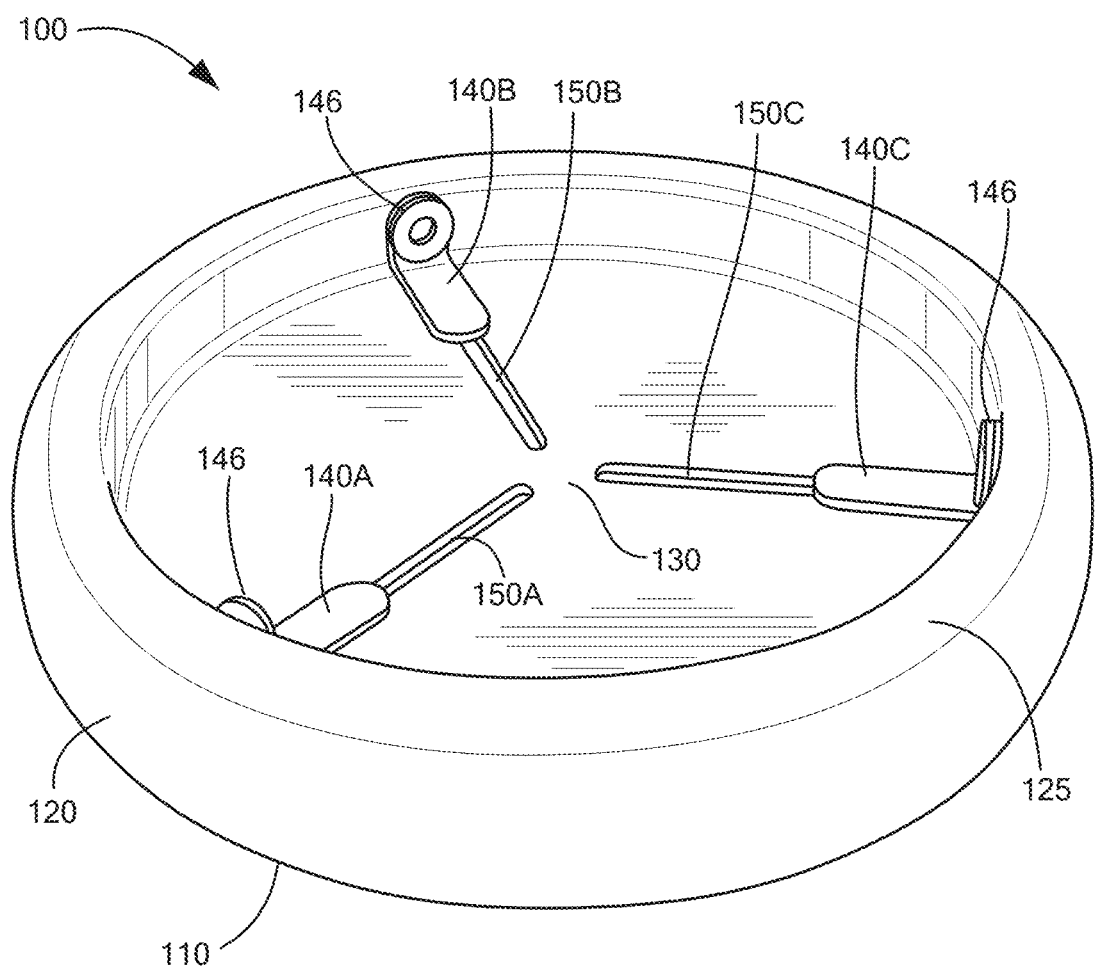
FIG. 1 schematically shows a perspective view of a container gripping device in accordance with embodiments of the present invention.
Figure 2:
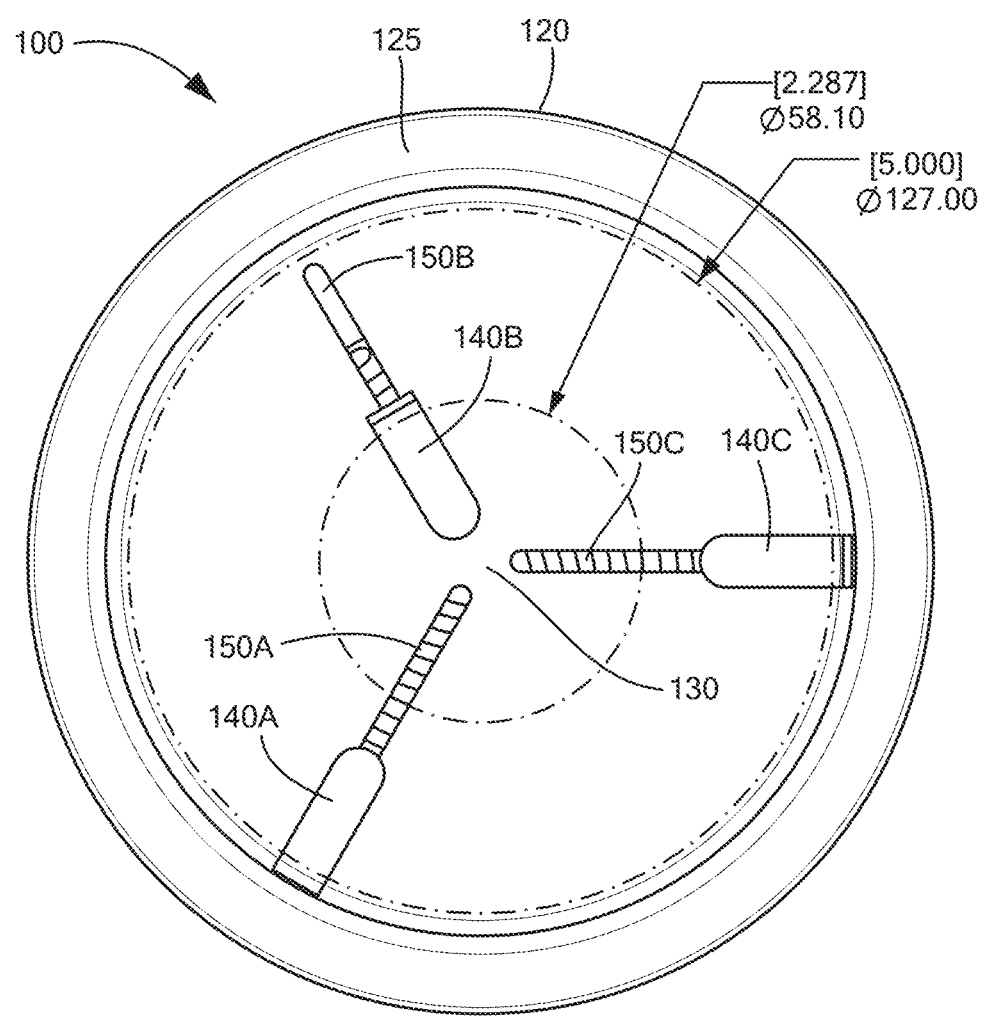
FIG. 2 schematically shows a top view of the container gripping device of FIG. 1 in accordance with embodiments of the present invention.
Figure 3:
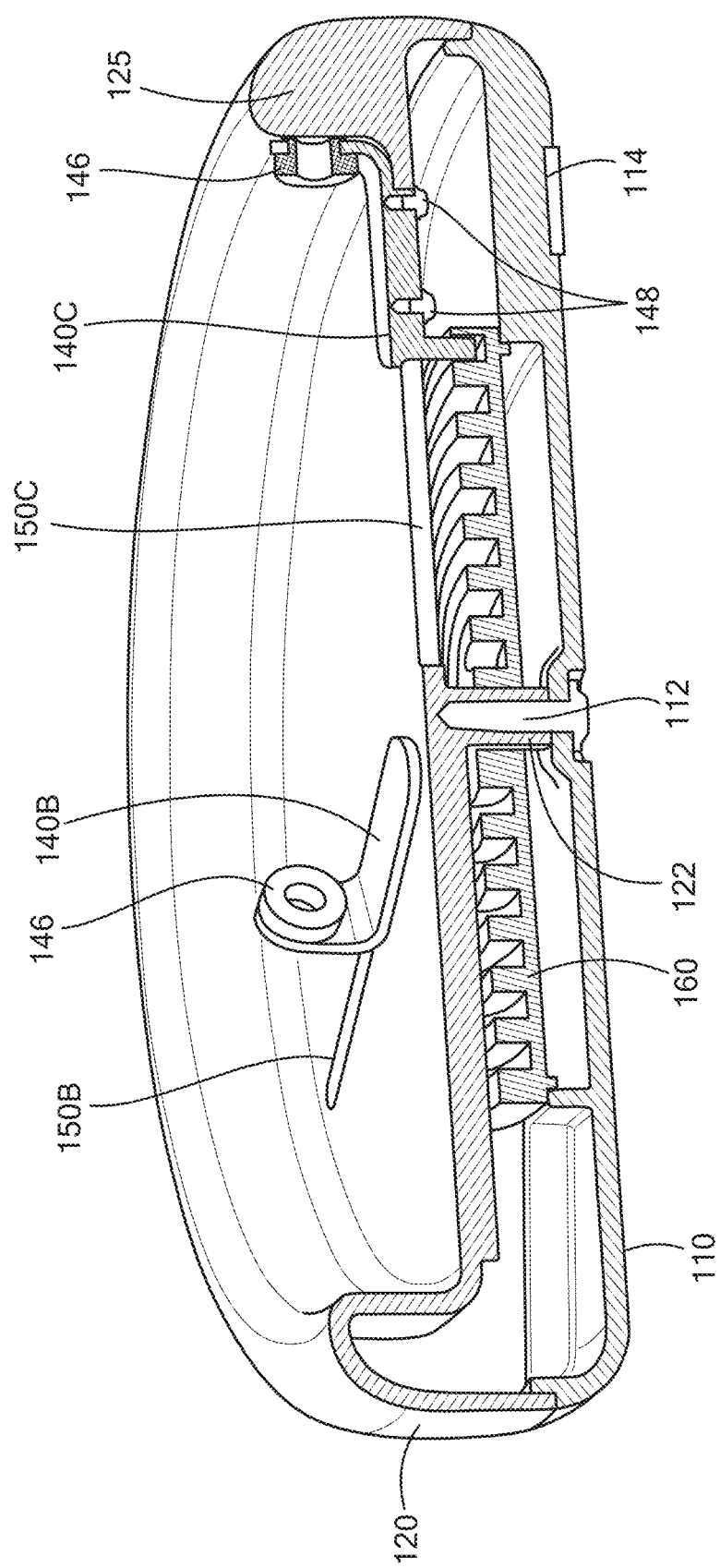
FIG. 3 is a cross-sectional view of the container gripping device of FIG. 1, in accordance with embodiments of the present invention.

In order to demonstrate the distinctions and advantages of the specially-configured top housing, certain prior art embodiments disclosed in U.S. patent application Ser. No. 15/296,479 are now described. FIG. 1 schematically shows one illustrative embodiment of a container gripping and securing device 100 having three movable jaw members. As shown in FIGS. 1 and 2, the container gripping device 100 includes a base 110 that, when the device 100 is in use, rests on a surface (e.g., a kitchen countertop, table, desk, etc.) on which the user wishes to open the container. The base 110 may include a number of features that stabilize the device 100 on the surface and prevent the device 100 from moving as the user operates the device 100 and/or removes the lid from the container. For example, as best shown in FIG. 3, the base 110 may include a number of feet 114 (e.g., two, three, four, five or more than five feet) located on the bottom of the base 110. The feet 114 (e.g., engagement members) may be rubber (or similar material) such that when the device 100 is resting on the kitchen surface, the feet 114 may grip the surface and prevent the device 100 from sliding/rotating. Additionally or alternatively, the base 110 may include other types of engagement members such as, for example, one or more vacuum or suction cups or a clamp to prevent the device 100 from moving during use.

Residing on top of the base 110, the device 100 may have a top housing 120 that provides a surface 130 on which the container to be opened maybe placed. As discussed above, the housing 120 has a raised outer periphery 125. Among other things, this raised outer periphery 125 provides a surface by which the user may grab the device 100 and also helps to prevent any container sitting on the surface 130 from sliding off the device 100 and onto the floor, countertop, table, etc.

As discussed in greater detail below, the top housing 120 may rotate about an axis and with respect to the base portion 110 to adjust the location of the jaw members 140A/140B/140C to grasp and hold the container in place. To that end, and as best shown in FIG. 3, the top housing 120 may have projection 122 that extends from an inner surface of the top housing and toward the base member 110. This projection 122 may be placed over a protrusion or screw member 112 extending upward from (and/or through) the base member 110 to hold the top housing 120 in place on the base member 110, but still allow the top housing 120 to rotate freely with respect to the base member 110 (e.g., the base member 110 remains stationary as the top housing 120 is rotated).

Figure 4:
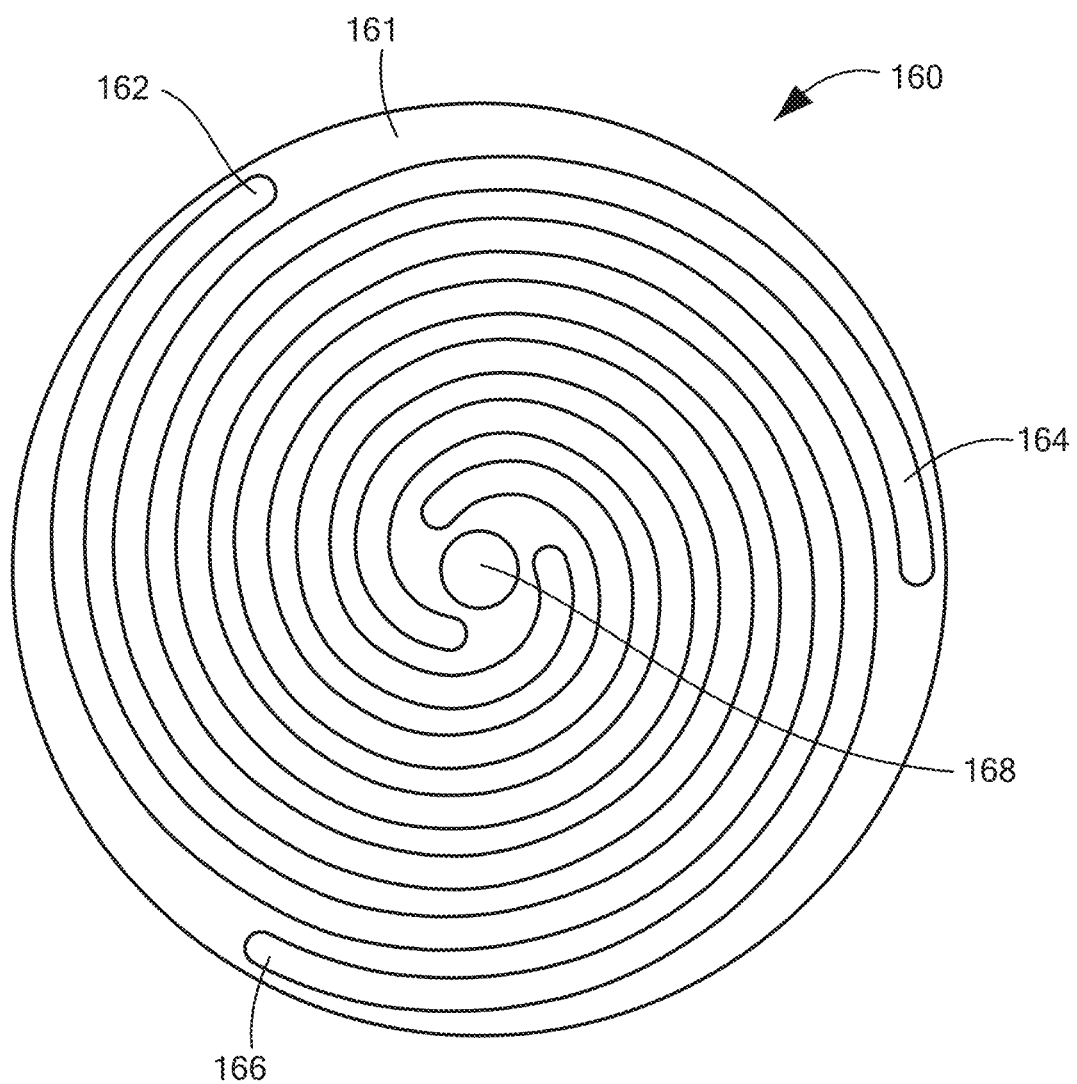
FIG. 4 schematically shows a spiral guide element of the jaw gripping device of FIG. 1, in accordance with various embodiments of the present invention.

Within the interior of the device 100 (e.g., between the base member 110 and the top housing 120), the device 100 includes a spiral guide member 160 that is secured to the base member 110. As best shown in FIG. 4, the spiral guide member 160 is a disk-like member and in this example has a plurality of spiral shaped guide channels 162/164/166 (e.g., one for each jaw member 140A/B/C) within the top surface 161 of the guide member 160. As discussed in greater detail below, the spiral guide member 160 and corresponding channels 162/164/166 interact with the jaw members 140A/140B/140C to cause the jaw members 140A/140B/140C to move radially inward and outward (e.g., toward and away from a container placed on the device 100) as a user rotates the top housing 120. To allow the projection 122 of the top housing 120 to pass through spiral guide member 160, the guide member 160 may have a through hole 168 near the center. The through hole 168 should be large enough to allow the top housing 120 and the projection to freely rotate without interference from the guide member 160.

As mentioned above, to grasp the container and hold it in place, the device 100 may include a number of jaw members 140A/140B/140C that, as discussed in greater detail below, reside within slots 150A/150B/150C in the top housing 120. The jaw members 140A/B/C are able to move back and forth within the slots (e.g., radially inward and outward with respect to the center of the top housing) in order to accommodate for various container sizes. As shown in FIGS.

3A/3B and FIGS. 4A-D, each of the jaw members 140A/140B/140C may have a body portion 141 that defines the overall structure of the jaw member 140A/140B/140C. Extending upward from the body portion 141, the jaw member 140A/140B/140C may have an engagement face 144 that acts to contact/engage the container to hold the container in place. To increase the friction between the jaw member 140A/140B/140C and the container, the engagement face 144 may include a resilient member 146 (FIGS. 1 and 5). For example, the engagement face 144 may have an opening 143 in which the resilient member 146 (FIGS. 1 and 5) may reside. Alternatively, the resilient member 146 may be secured to the engagement face 144 via adhesive or other securement method. As discussed in greater detail below, as the jaw members 140A/140B/140C begin to make contact with the container, the resilient members 146 will begin to deform to more securely hold the container in place.

To facilitate the interaction with each of the slots 150A/B/C, each of the jaw members 140A/140B/140C includes a ridge 147 along a length of the underside of the body portion 142. When assembled with the top housing 120, this ridge 147 sits within the slot 150A/B/C for the respective jaw member 140A/140B/140C. To secure the jaw member 140A/140B/140C to the top housing 120, the ridge 147 may include one or more threaded holes 149 in which a screw 148 (FIG. 3) may be threaded. As noted above, the jaw members 140A/140B/140C move radially inward and outward along the slots 150A/B/C. Therefore, the slots 150A/B/C and the ridge 147 should be sized to allow some clearance between the outer wall of the ridge 147 and the inner wall of the slot 150A/B/C. Additionally, when inserting the screw 148 into the threaded hole 149, the screw 148 should be left loose enough such that it does not bind the jaw 140A/B/C to the top housing 120 and prevent the jaw 140A/B/C from sliding.

Figure 5A:
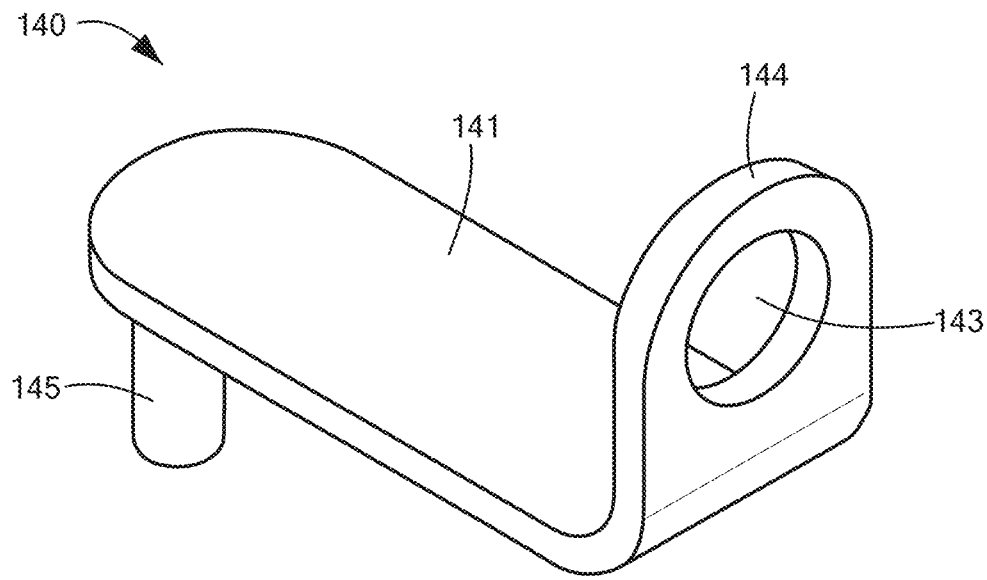
FIGS. 5A and 5B schematically show top and bottom perspective views of an exemplary jaw element, in accordance with embodiments of the present invention.
Figure 5B:
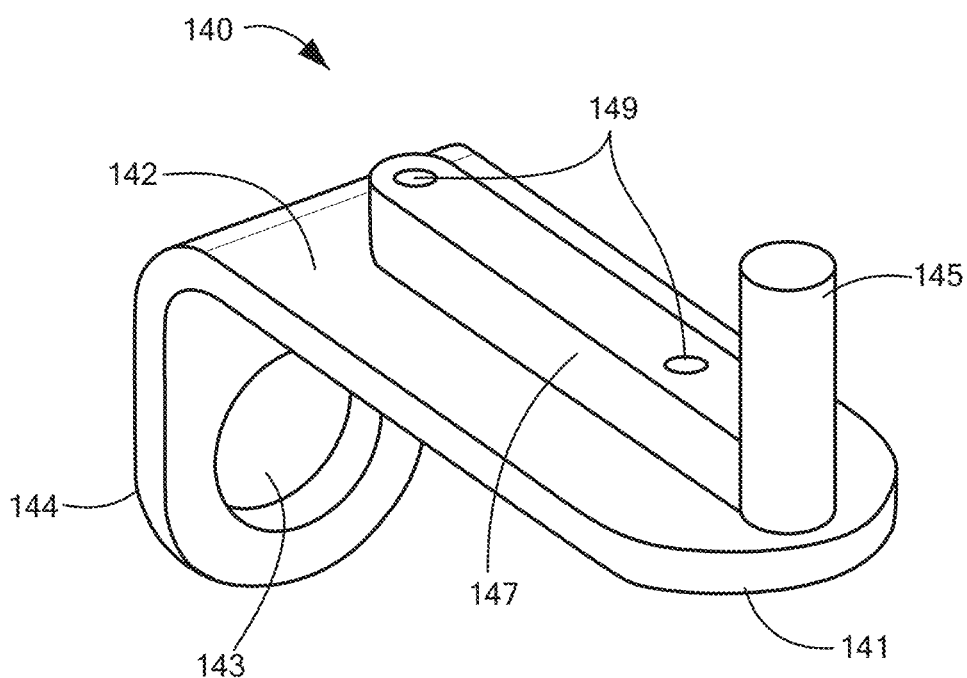
Figure 6A:
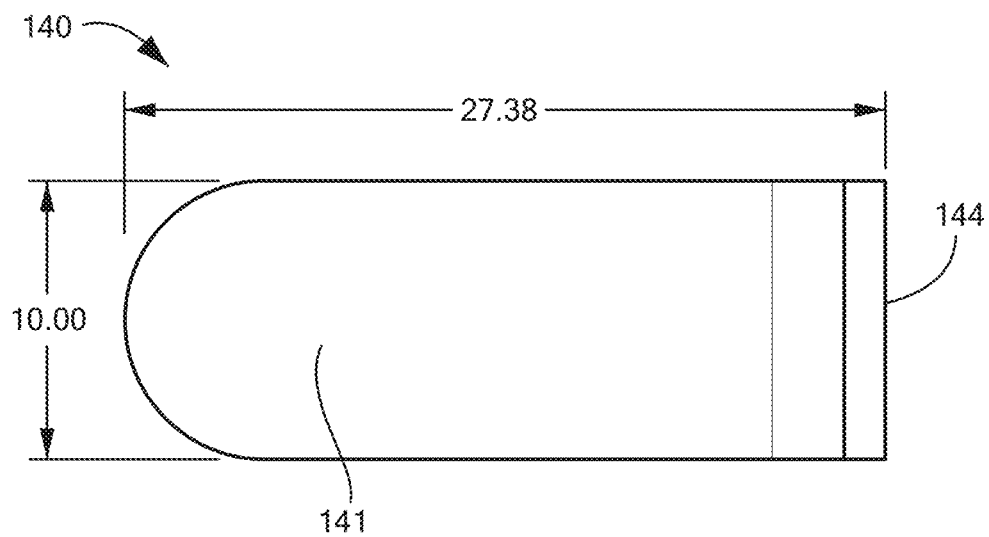
FIGS. 6A-6D schematically show top, front, bottom and side views of an exemplary jaw element, in accordance with embodiments of the present invention.
Figure 6B:
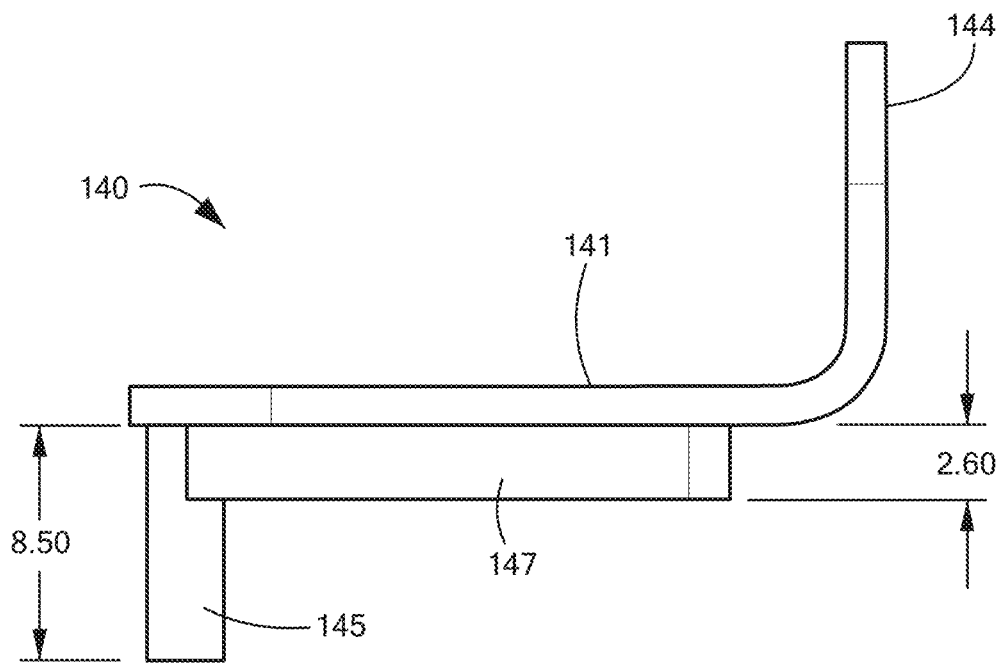
Figure 6C:
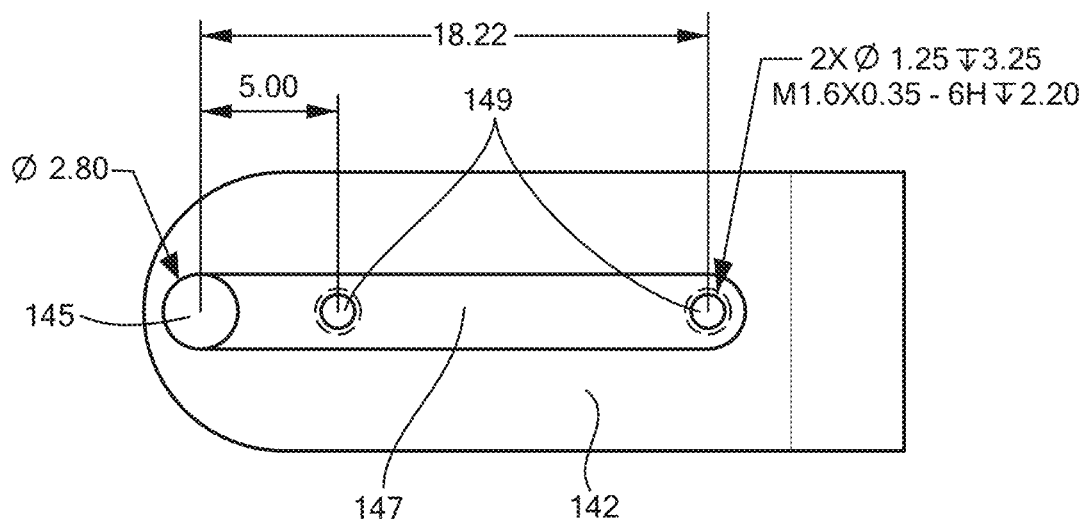
Figure 6D:
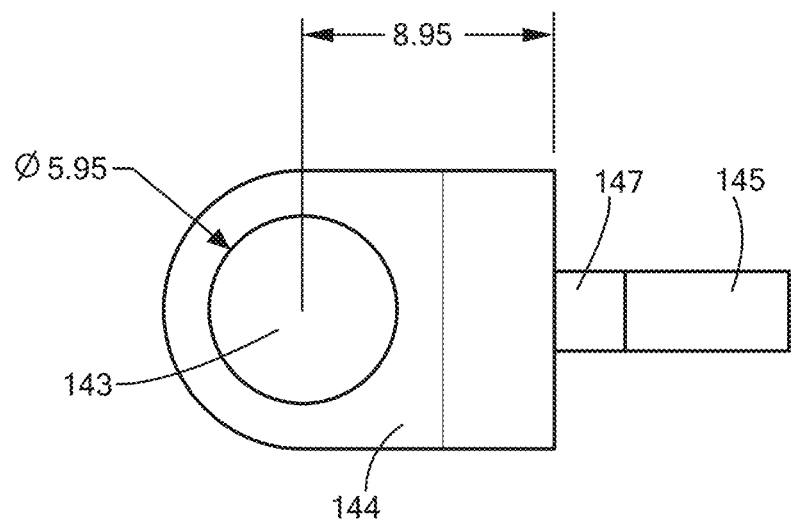

Also, on the underside of the body portion 141, each of the jaw members 140A/B/C has a protrusion 145 (e.g., a post member) that extends downward from the jaw member 140A/B/C and through the slot 150A/B/C. As best shown in FIGS. 5A, 5B and 6B, the protrusion 145 extends further than the ridge 147. As discussed in greater detail below, the protrusion 145 of each of the jaw members 140A/B/C resides within one of the of spiral shaped guide channels 162/164/166 of the spiral guide member 160 to cause each of the jaw members 140A/B/C to move radially inward and/or outward during use.

During use, to adjust the location of the jaw members 140A/B/C, the user may rotate the top housing 120. As the top housing 120 rotates, the jaw members 140A/B/C (which as discussed above are secured to the top housing 120) will rotate with the top housing 120 and the protrusion 145 will move along within the respective guide channel 162/164/166 of the guide member 160. This, in turn, will cause the jaw members 140A/B/C to move radially inward or outward (e.g., within the slot 150A/B/C) with respect to the center of the device 100 (e.g., with respect to the axis of rotation) depending on the direction of rotation of the top housing 120. For example, if the top housing is moved in a first direction (e.g., counter clockwise), the protrusion 145 will follow the respective guide channel 162/164/166 toward the center of the spiral guide member 160 and the jaw members 140A/B/C will move radially inward (see FIG. 7 which shows the jaw members 140A/B/C moved partially inward after rotation of the top housing 120). Conversely, if the top housing 120 is moved in the opposite direction (e.g., clockwise), the protrusion 145 will follow the respective guide channel 162/164/166 away from the center of the spiral guide member 160 and the jaw members 140A/B/C will move radially outward (e.g., back to the position shown in FIG. 1).

It is important to note that, although the direction of rotation to move the jaw members 140A/B/C inward and outward may vary (e.g., in some embodiments a counter clockwise rotation may cause the jaw members 140A/B/C to move inward and in other embodiments a clockwise rotation may cause the jaw members 140A/B/C to move inward), in some embodiments it may be preferable to set the direction based on the rotational movement required to open and/or close the lid on the container. For example, in order to ensure that the jaw members 140A/B/C do not loosen when twisting of the lid, in some embodiments, it may be preferable to set the direction of rotation to move the jaw members 140A/B/C radially inward (e.g., to tighten the jaw members 140A/B/C) to be counter-clockwise. Therefore, in such embodiments, as the user begins to twist off the container lid, any force applied to the device will only cause the jaw members 140A/B/C to tighten on the container as opposed to loosen.

Figure 7:
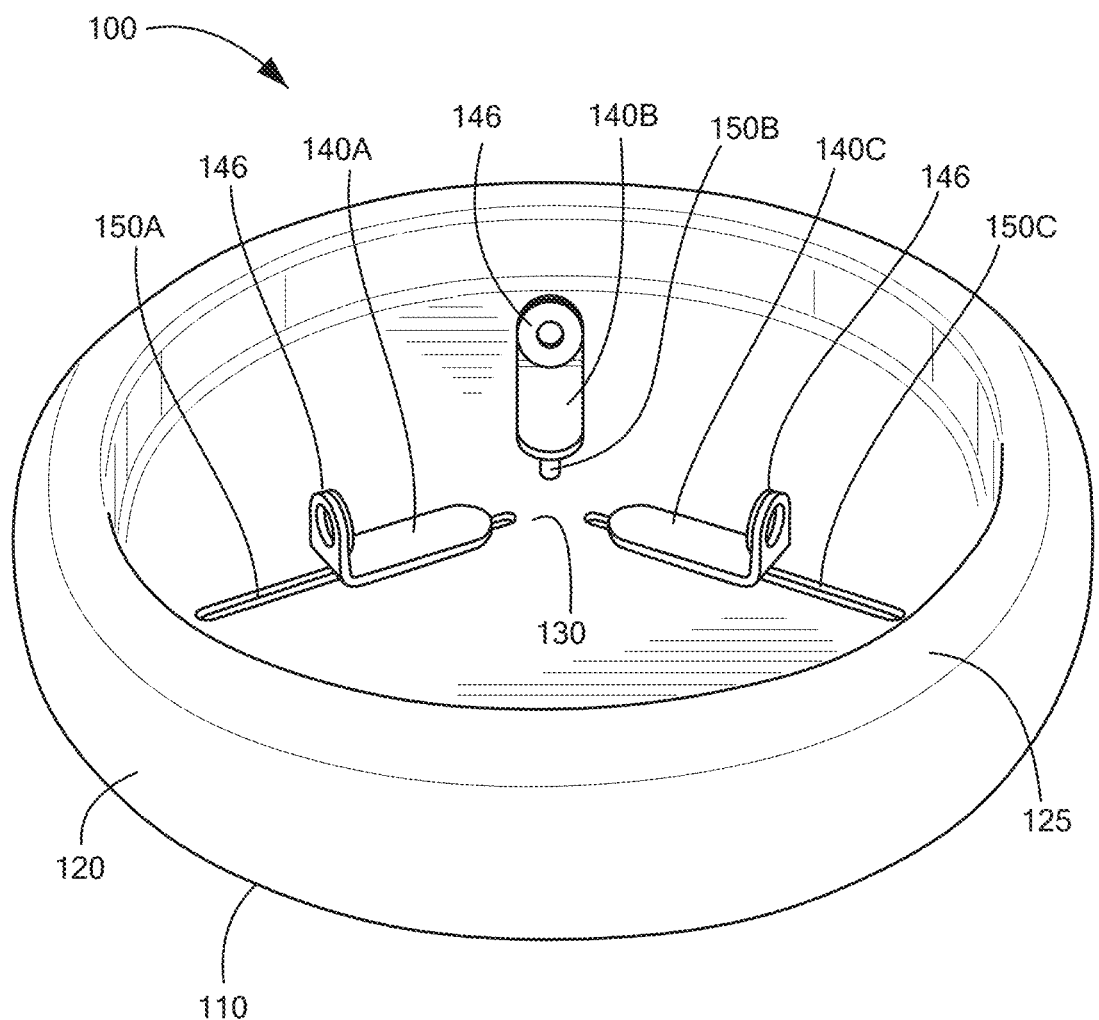
FIG. 7 schematically shows the container gripping device of FIG. 1 with the jaw elements partially moved in, in accordance with embodiments of the present invention.
Figure 8:
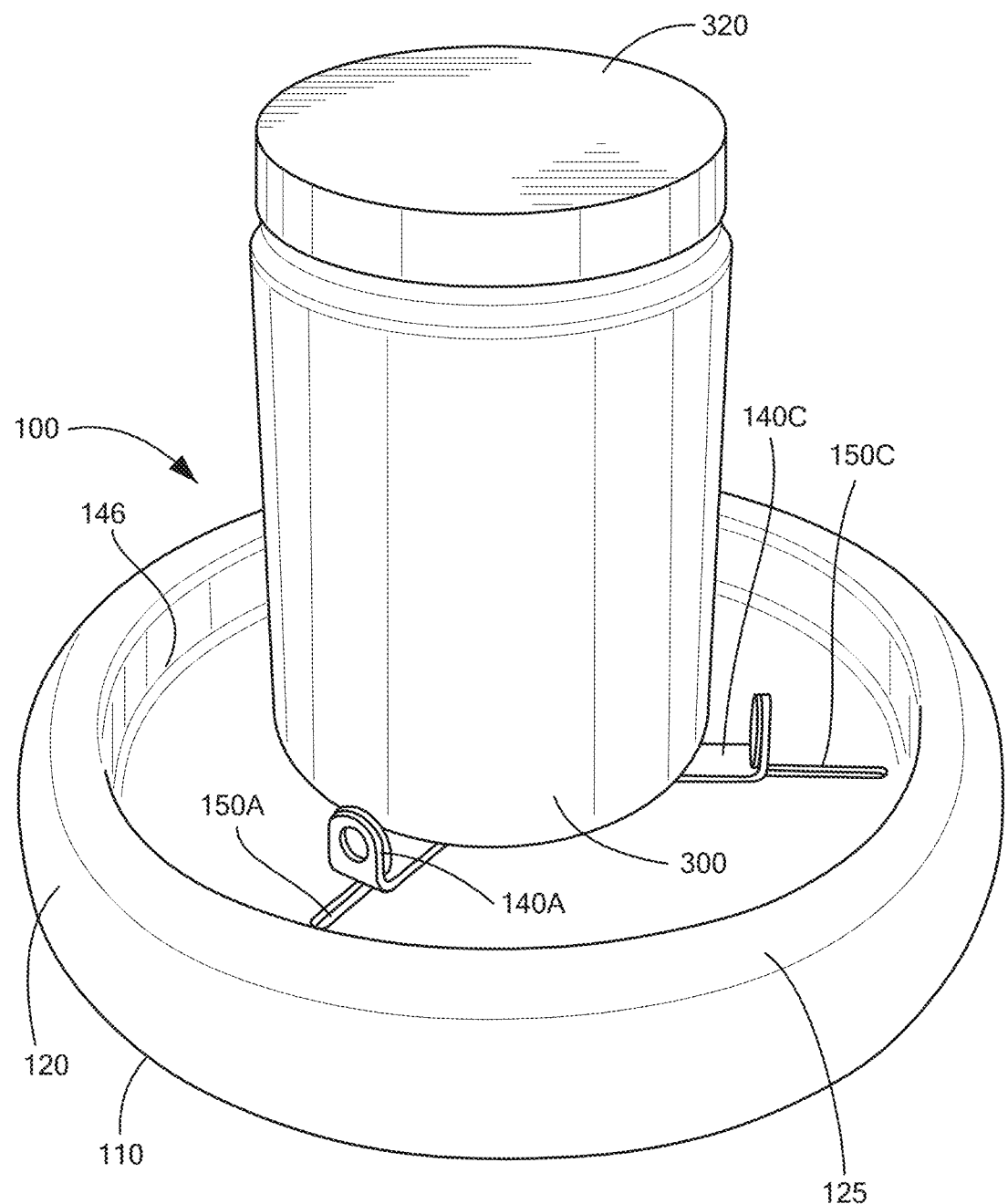
FIG. 8 schematically shows the container gripping device of FIG. 1 with a container placed on the device, in accordance with embodiments of the present invention.
Figure 9:
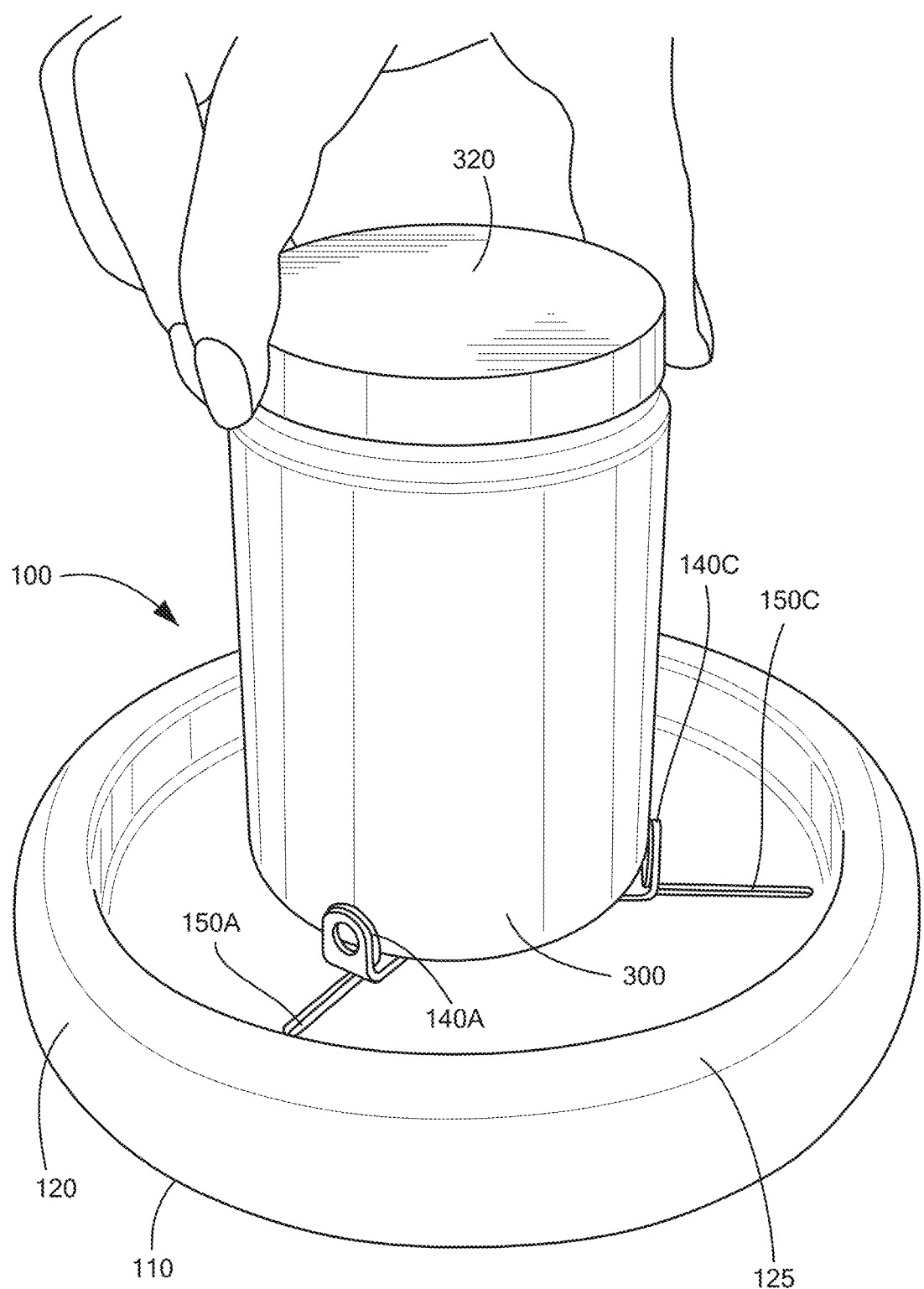
FIG. 9 schematically shows the container gripping device of FIG. 1 with a container placed on the device and held in place with a user opening the lid, in accordance with embodiments of the present invention.

FIGS. 7 through 9 show the device 100 at various stages of operation and use (e.g., to open a jar lid). As shown in FIG. 7, in order to minimize the amount the top housing 100 has to be rotated after placing the container 300 on the device 100, the user may optionally rotate the top housing 120 to bring the jaw members 140A/B/C closer to the center of the device 100, but not so much as to prevent the container 300 from being placed on the top housing surface 130. The user may then place the container 300 on the surface 130 of the top housing 120 (FIG. 8) and continue rotating the top housing 120 until the jaw members 140A/B/C engage the base of the container 300. In particular, when the jaw members 140A/B/C begin to engage the base of the container 300, the resilient member 146 located on the engagement face 144 will contact the wall of the container 300 and begin to deform. As the top portion 120 rotates further, the resilient members 144 will deform further until the jaw members 140A/B/C have a firm grasp on the container 300. At this point, the container 300 is secured in place, the jaw members 140A/B/C prevent the container 300 from rotating, and the user is free to remove the lid to open the container 300.

It should be noted that, because the device 100 securely grasps and holds the container 300 and the device 100 remains stationary on the kitchen surface, the user is free to use one or both hands to remove the lid 310. This may be particularly beneficial for individuals with arthritis and/or low dexterity as the user no longer needs to manipulate the container 300 with one hand and turn the lid 310 with the other.

After removing the lid 310 from the container 300, the user may simply reverse the process to remove the container 300 from the device. For example, after the lid 310 is removed, the user may rotate the top housing 120 in the opposite direction (e.g., clockwise). This, in turn, will cause the jaw members 140A/B/C to disengage from the container 300 and begin to move radially outward away from the center of the device 100 and the container 300. Once the jaw members 140A/B/C are moved sufficiently far away, the user may then remove the container 300 from the device to access to contents of the container 300.

It should be noted that, although FIG. 1 shows a device 100 having three jaw members 140A/B/C, other embodiments may have more or less jaw members 140A/B/C. For example, some embodiments may have less than three jaw members 140A/B/C (e.g., two) or more than three jaw members 140A/B/C (e.g., four, five, six, etc.). Additionally or alternatively, not all of the jaw members 140A/B/C need to move as the top housing 120 rotates. For example, in some embodiments, the container gripping apparatus may be configured with a single movable jaw member and one or more stationary jaw members, or the container gripping apparatus may be configured with two opposing movable curved (e.g., C-shaped) jaw members that move as the top housing 120 rotates.

Figure 10A:
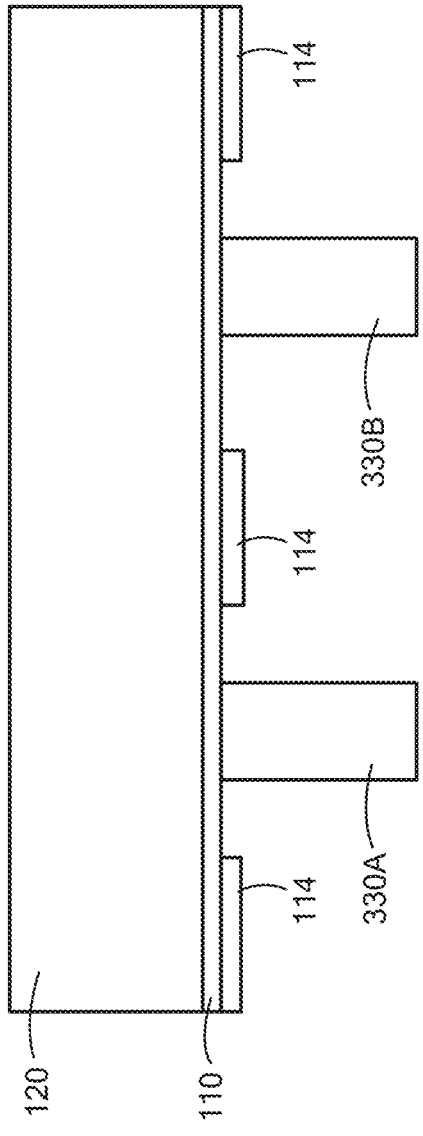
FIGS. 10A to 10D schematically show an alternative container gripping device, in accordance with additional embodiments of the present invention.
Figure 10B:
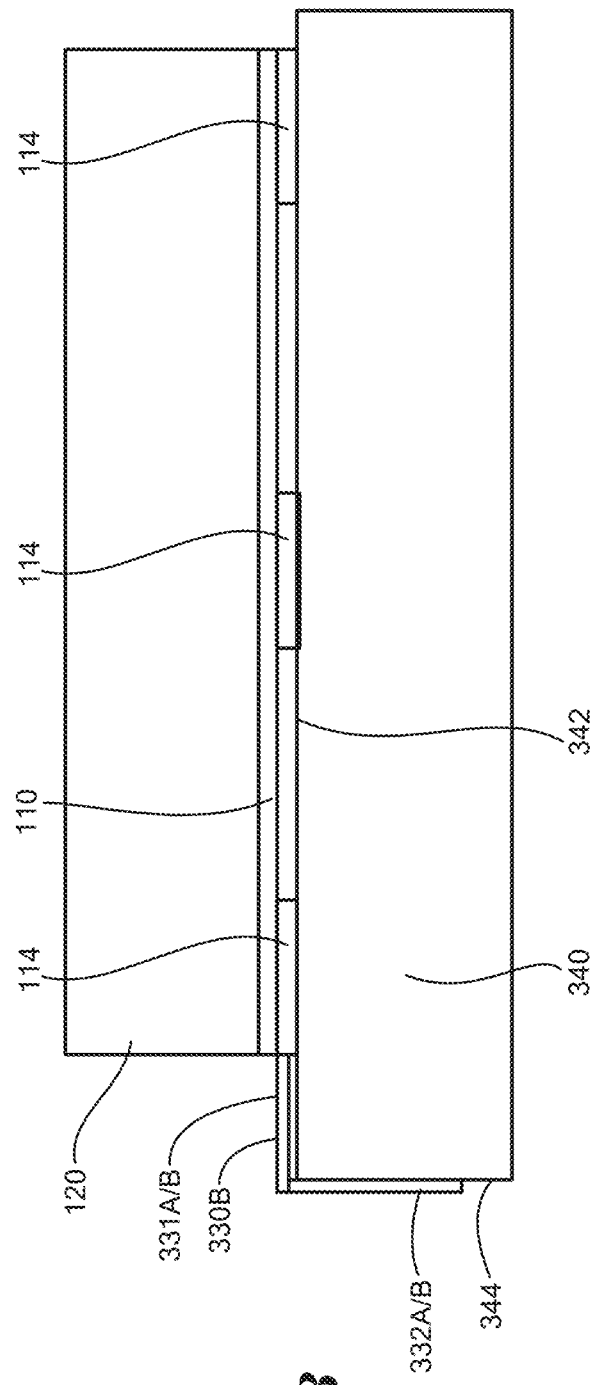
Figure 10C:
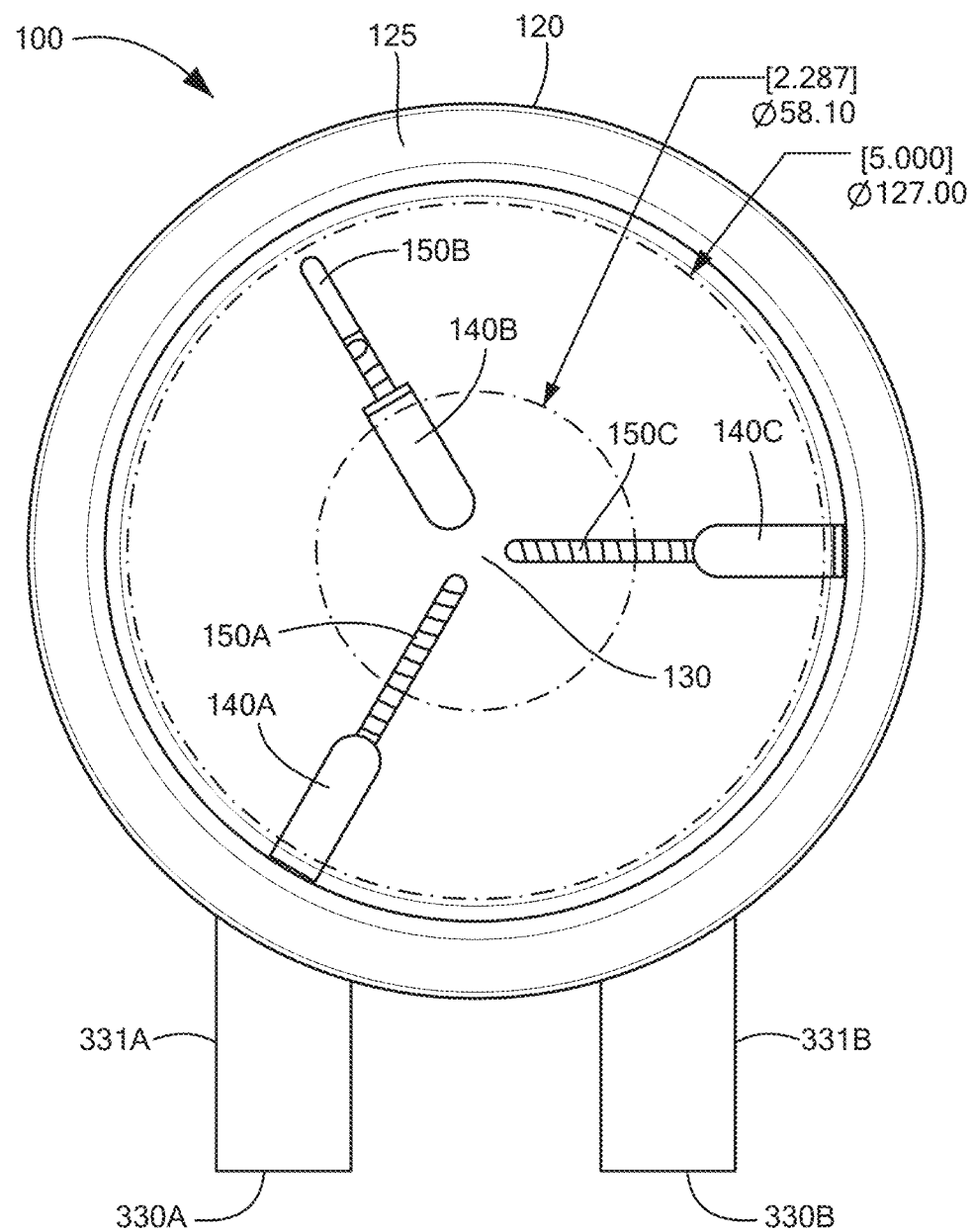

FIGS. 10A through 10D show an alternative embodiment of the container gripping and securing device 100 with additional structures to aid in stabilizing the device 100 on surface (e.g., the kitchen surface/counter) during use. In particular, as shown in FIGS. 10A through 10C, the device 100 may have leg members 330A/330B that extend out and downward from the base 110. For example, each of the leg members 330A/330B may have a horizontal portion 331A/B and a vertical portion 332A/B. The horizontal portion 331A/B extends out from the base 110 and lies along the top 342 of the surface 340 (e.g., the kitchen counter) on which the device 100 sits. The vertical portion 332A/B contacts the edge 344 of the surface 340. In this manner, the horizontal portion 331A/B of the leg members 330A/330B allow the device 100 (e.g., the base 110 and top housing 120) to be located away from the edge 344, while the vertical portions 332A/B engage the edge 344 of the kitchen surface (e.g., the edge of the countertop) during use to prevent the device 100 from slipping and/or rotating (e.g., when the top housing 120 is rotated and/or the container lid 320 removed).

For example, in embodiments containing the leg members 330A/330B, when the top housing 120 is rotated in a clock-wise direction, leg member 330A (e.g., the vertical portion 332A) will be forced against the edge 344 of the countertop 340 to prevent the device 100 from rotating. Conversely, when the top housing 120 is rotated in the counter clockwise direction (or the lid 320 is being removed), leg member 330B (e.g., vertical portion 332B) will be forced against the edge 344 of the countertop 340 to prevent the device 100 from rotating. It should be noted that, to further prevent the device 100 from rotating, the user may position their body against the non-engaging leg member (e.g., leg member 330B during clockwise rotation and leg member 330A during counterclockwise rotation) to hold the device 100 against the edge of the surface/counter. To prevent damage to the surface 340 (e.g., the top 342 and/or the edge 344 of the surface 340), the leg members 330A/330B may include padding (not shown) on the leg surfaces contacting the countertop/surface 340.

Figure 10D:
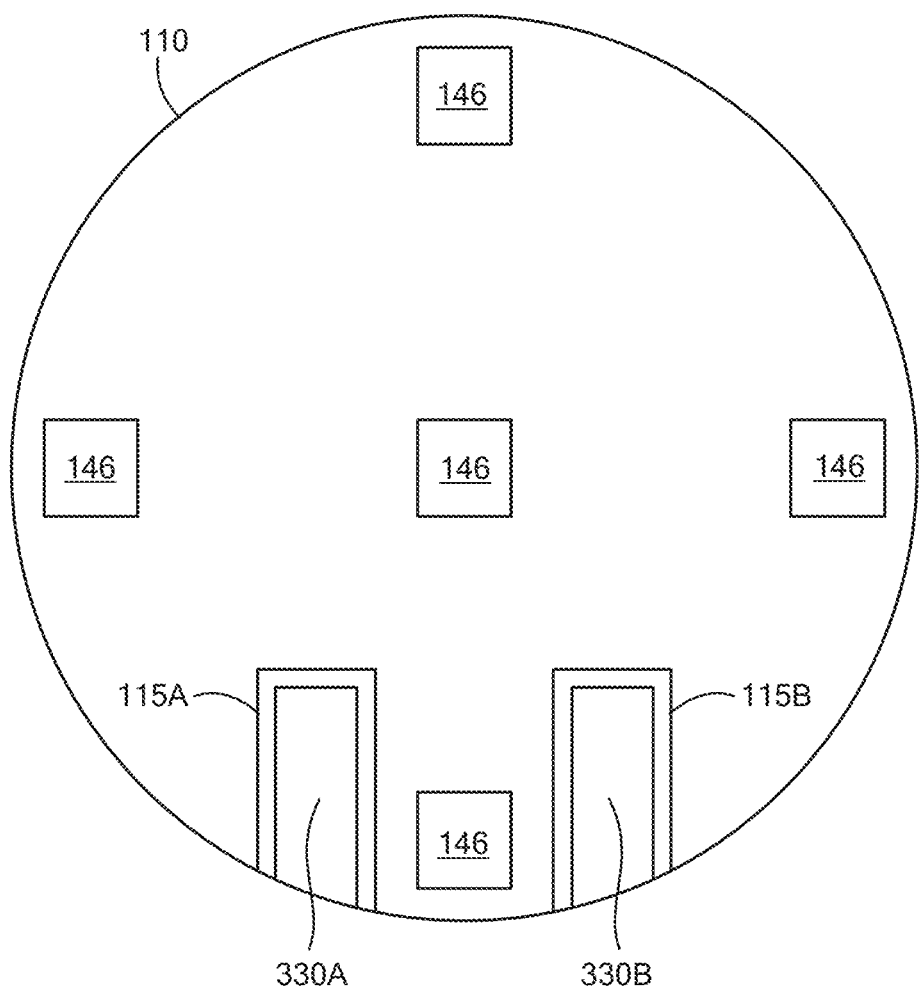

To prevent the leg members 330A/330B from accidentally being damaged and allow the device 100 to be easily moved (e.g., away from the edge of the counter), in some embodiments, the leg members 330A/330B may be removable and/or retractable. For example, the legs members 330A/330B may be clipped on and off the base 110 as needed. Alternatively, as shown in FIG. 10D, the base 110 may include recessed areas 115A/B into which the leg members 330A/330B may fold-up and/or retract. In such embodiments, the leg members 330A/330B may be spring loaded such that they automatically retract into the recessed areas 115A/B and may include a hinge between the horizontal portions 331A/331B and vertical portions 332A/332B to allow the leg members 330A/B to be folded out. To that end, when the user wishes to use the device 100, they may pull the leg members 330A/B out from the recessed areas 115A/B, fold out the vertical portions 332A/332B and place the device 100 on the counter 340 such that the vertical portions 332A/332B engage the edge 342 of the counter and the horizontal portions 331A/B rest on the top surface of the counter 340. Conversely, when the user is done and seeks to move or put the device away (e.g., within a drawer), the user may simply lift the device 100 and the spring will cause the leg members 330A/B to automatically retract into the recessed areas 115A/B.

Figure 11A:
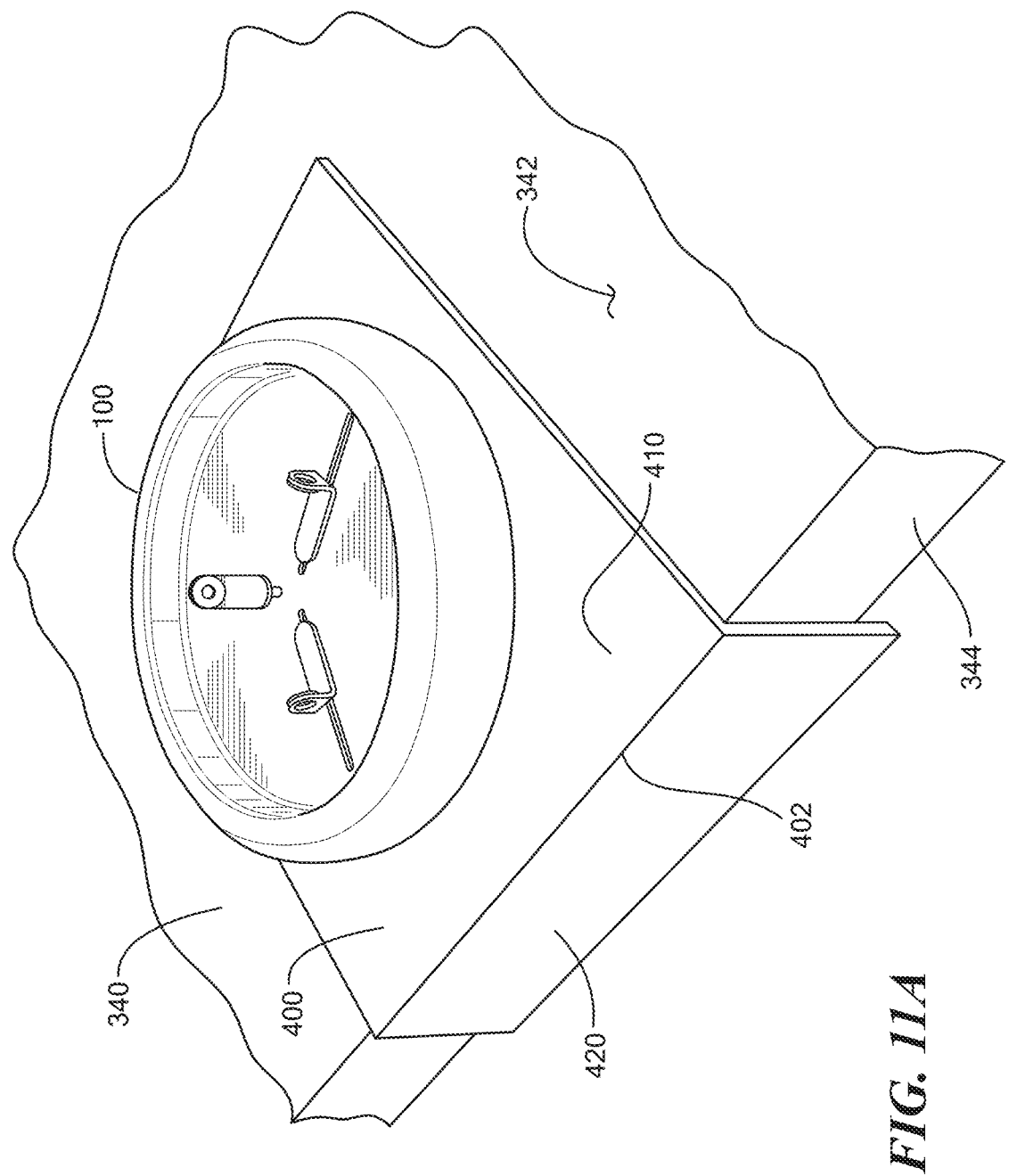
FIGS. 11A to 11C schematically show a container gripping device with an alternative counter brace, in accordance with additional embodiments of the present invention.
Figure 11B:
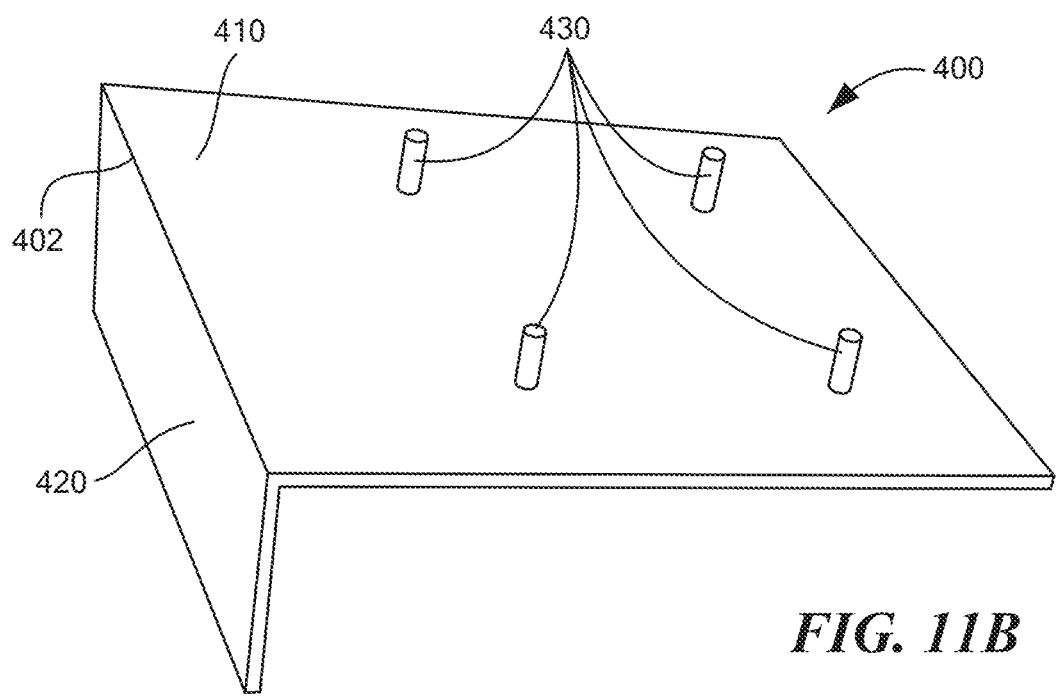
Figure 11C:
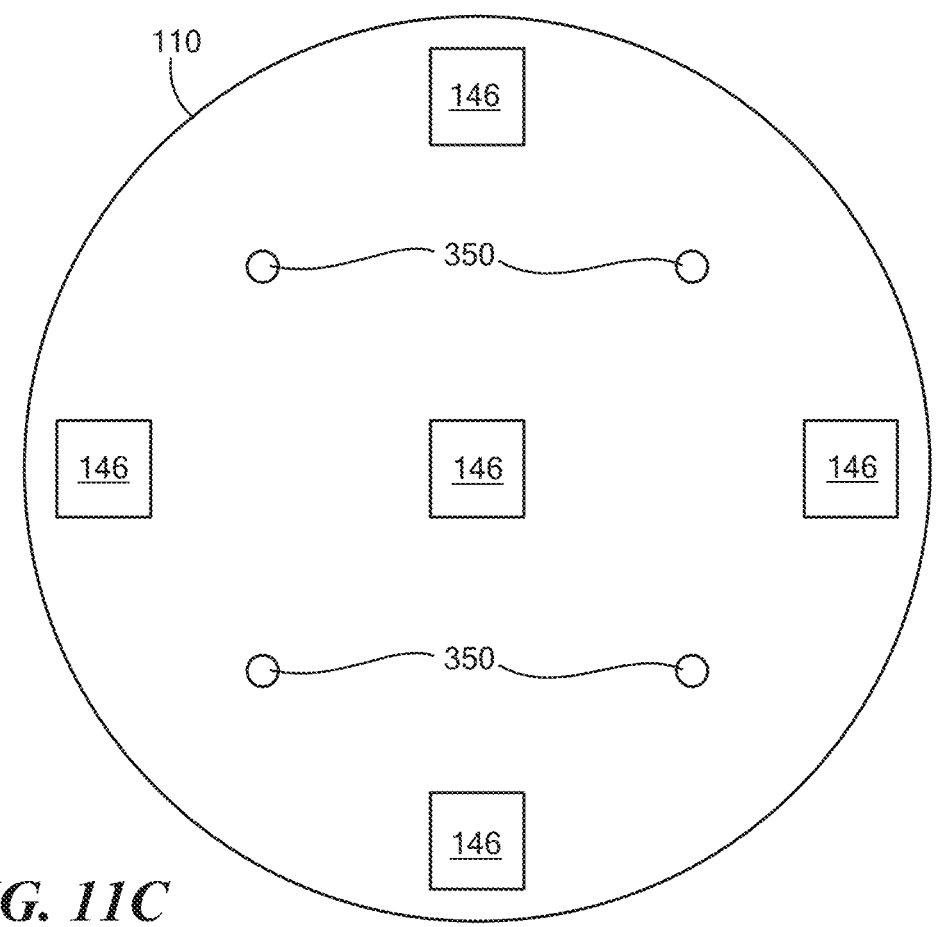

FIGS. 11A to 11C schematically show a container gripping device with an alternative counter brace 400 for stabilizing the device 100 on the counter 340. As shown, the counter brace 400 may be an L-shaped structure that secures to the base 110 of the device 100. The brace 400 may be made from any number of rigid materials, for example, a rigid plastic, wood, metal, etc. and may be removably secured to the base 110 (e.g., so that it can be removed when the device 100 is not in use) or permanently secured to the base 110. Like the leg members 330A/B discussed above, during use, the horizontal portion 410 of the brace 400 may rest on the top surface 342 of the counter 340 and the vertical portion 420 of the brace 400 may rest against/engage the edge 344 of the counter 340 to keep the device 100 stationary while the top housing 120 is rotated and/or the container lid 320 is being removed. To protect the counter 340 from damage, both the horizontal and vertical portions of the brace 400 may include padding.

To secure the brace 400 to the device, the brace 400 may include a number of post members 430 that extend up from horizontal surface 410 of the brace 400. Additionally, the base 110 of the device 100 may include a number of holes 350 (FIG. 11C) that correspond to each of the post members 430. Therefore, to secure the brace 400 to the device 100, the user may simply place the device 100 onto the brace 400 such that each of the post members 430 enters a respective hole 350 in the base 100. It should be noted that the post members 430 and the holes 350 may have smooth surfaces (e.g., they are not threaded) such that the post members 430 can easily slide into and out of the holes 350 as needed. Alternatively, the post members 430 and the holes 350 may be threaded. In such embodiments, to secure the brace 400 to the device 100, the user may thread/screw the post members 430 into each of the holes 350.

It should be noted that, although FIG. 11B shows a rigid brace 400, other embodiments may include a hinge located between the horizontal portion 410 and the vertical portion 420 to allow the brace 400 to be folded and stored more easily. For example, the brace 400 can include a standard hinge(s), low-profile hinge(s), or living hinge(s) between the horizontal portion 410 and the vertical portion 420. To that end, when the device 100 is not in use, the user may remove the brace 400, fold it up, and store the brace 400 in a drawer, for example.

It is also worth noting that, although FIGS. 11A to 11C show the post members 430 extending up from the brace 400 and into the device 100, other configurations are possible. For example, in some embodiments, the post members may extend down from the device 100 (e.g., from the base 110) and into holes within the brace 400 (e.g., within the horizontal portion 410). However, in such embodiments, it is preferable that the post members do not extend too far from the base 110 to ensure that the device 100 can sit flat on the counter 340 when secured to the brace 400. To that end, it may be preferable that the length of the post members extending down from the base 100 not exceed the thickness of the horizontal portion 410 of the brace 400 to ensure that the post members do not poke out from the bottom of the horizontal portion 410.

It is important to note that the overall size of the device 100 should be balanced against the range of container 300 sizes that the device 100 is most likely to encounter and the counter space that the device 100 will take up. For example, the device 100 should be large enough to accommodate most typical container sizes (e.g., 1.5" diameter to 5" diameter containers) but not so large as to take up a large amount of counter or drawer space and/or not be able to fit into a drawer. Additionally or alternatively, when not being used to open containers 300, the device 100 may be used to hold other objects such as, but not limited to, vases, fruit bowls, decorative dishes, etc. In this manner, even when the device 100 remains on the countertop, the space occupied by the device 100 is not wasted.

The substantial thickness or width of the raised outer periphery 125 of the container gripping devices shown in FIGS. 1-11 can assist with gripping and rotation of the top housing 120, but the inner wall of the raised outer periphery 125 also effectively limits the outward range of motion of the jaw member(s). As discussed above, embodiments of the present invention provide an improved container gripping apparatus that utilizes a specially-configured top housing in which the raised outer periphery includes recesses positioned to allow the movable jaw member(s) a greater outward range of motion and to provide enhanced grip locations for the user.

Figure 12:
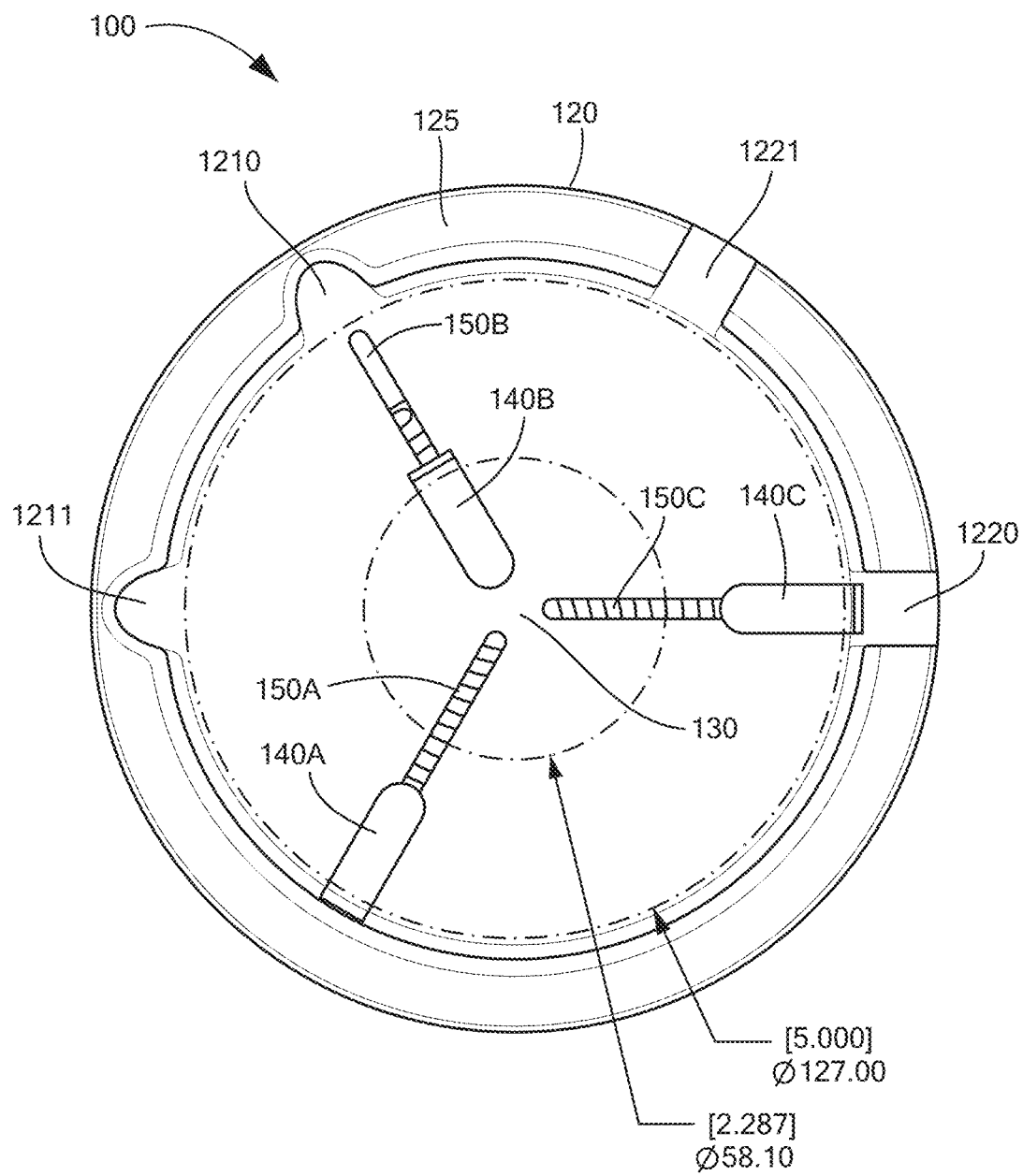
FIG. 12 is a schematic diagram showing various recess configurations and placements, in accordance with exemplary embodiments of the present invention.

FIG. 12 is a schematic diagram showing various recess configurations and placements, in accordance with exemplary embodiments of the present invention. A first type of recess 1210 extends partially through the raised outer periphery 125, whereas a second type of recess 1220 extends fully through the raised outer periphery 125. As shown, both types of recesses 1210 and 1220 would allow a greater outward range of motion of the jaw members 140. Other types of recess configurations allowing greater outward range of motion are possible. Typically, a recess is positioned in line with each movable jaw member. Typically, all such recesses would be of the same type, e.g., all extending partially through the raised outer periphery 125 such as recess 1210 or all extending fully through the raised outer periphery 125 such as recess 1220, although this is not required. It should be noted that when the movable jaw members are out of the recesses (e.g., as the user rotates the top housing to grip the container), the recesses will be (or become) accessible to the user such as for enhanced gripping and rotational torque of the raised outer periphery.

Optionally, one or more additional recesses may be placed at other positions about the raised outer periphery 125, e.g., to provide additional gripping locations. FIG. 12 shows a partially-extending recess 1211 positioned approximately half-way between jaw members 140A and 140B and also shows a fully-extending recess 1221 positioned approximately half-way between jaw members 140B and 140C. Again, typically, all such additional recesses would be of the same type, e.g., all extending partially through the raised outer periphery 125 such as recess 1211 or all extending fully through the raised outer periphery 125 such as recess 1221, although this is not required. These additional recesses will be accessible to the user such as for enhanced gripping and rotational torque of the raised outer periphery.

Figure 13A:
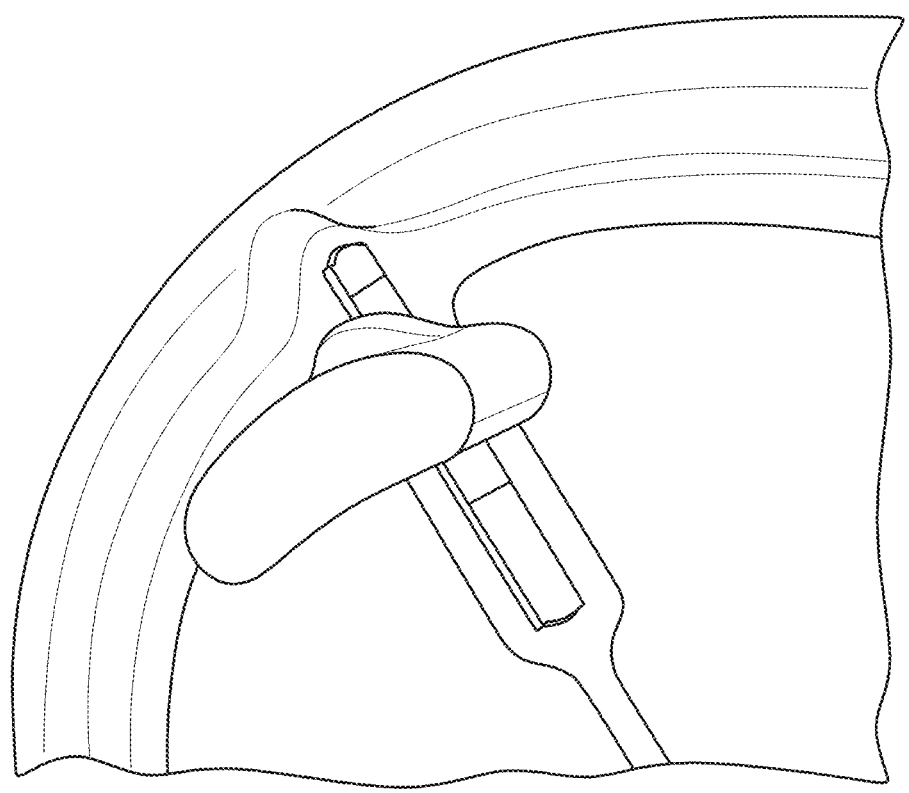
FIGS. 13A-C are annotated photographs showing a portion of a prototype top housing 120 including a partially-extending recess positioned to allow a greater range of motion of a jaw member, in accordance with one exemplary embodiment.
Figure 13B:
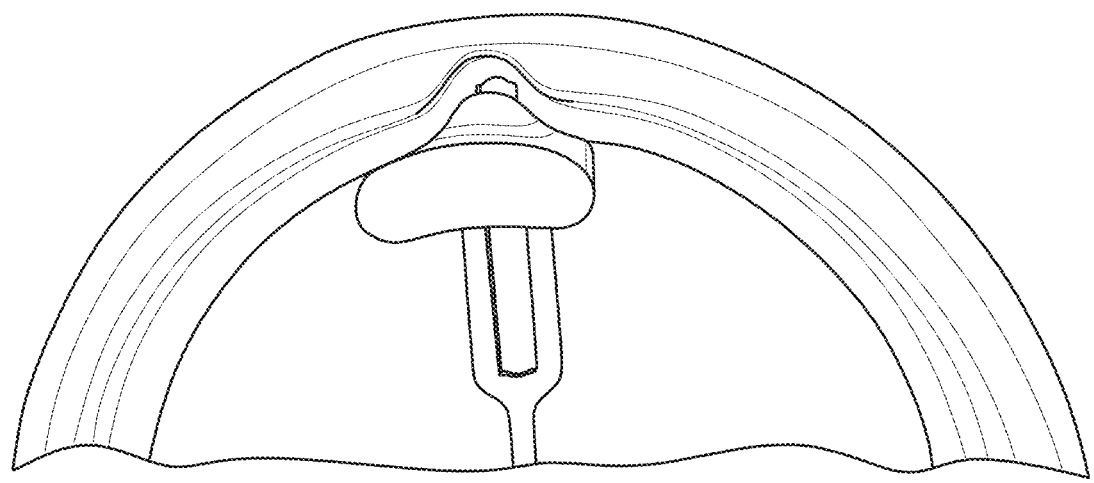
Figure 13C:
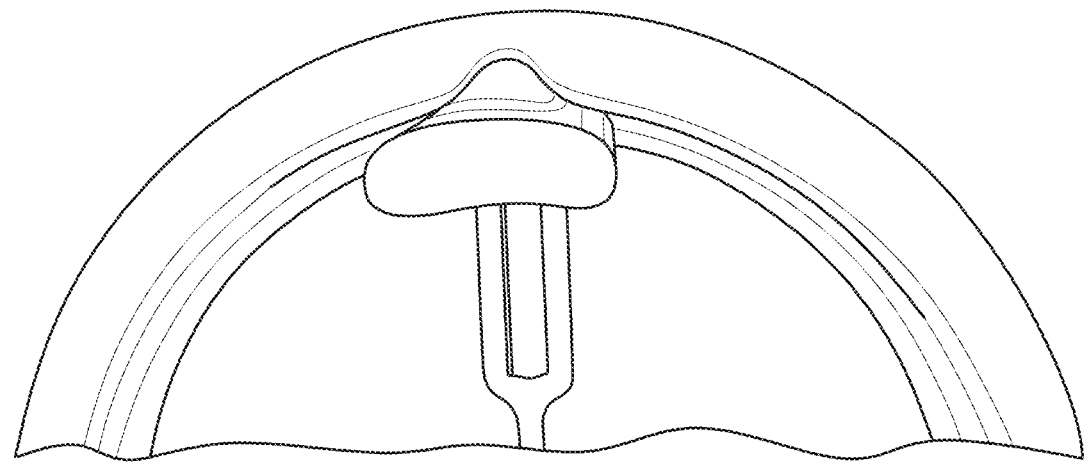
Figure 14:
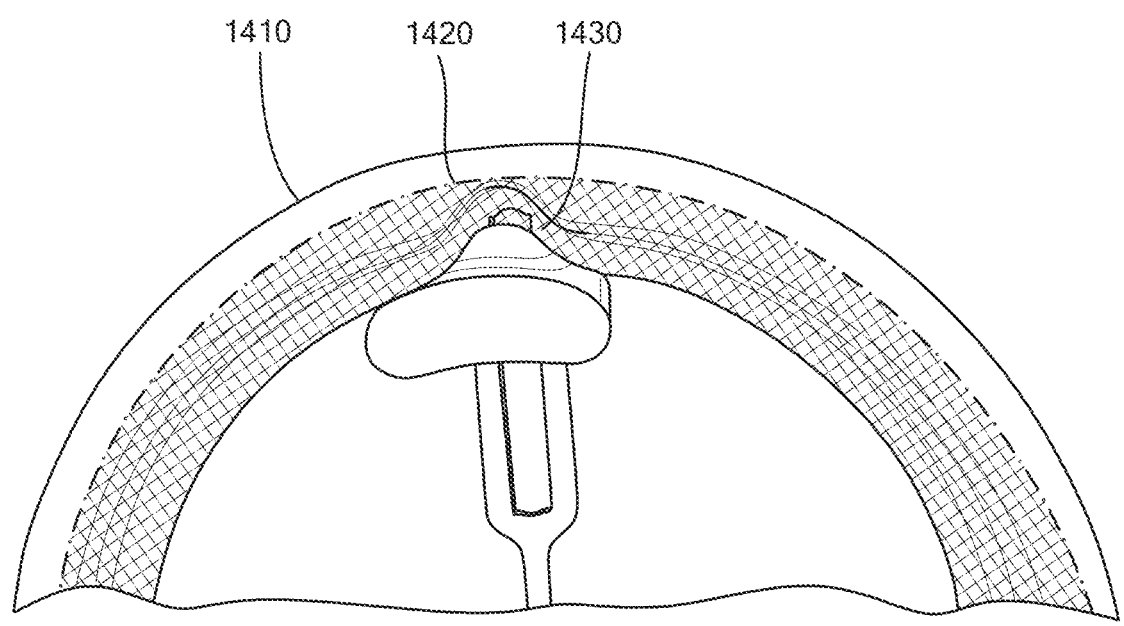
FIG. 14 is an annotated photograph showing the original outer wall of the original container gripping device and a theoretical outer wall of a reduced size container gripping device having a recess, in accordance with one exemplary embodiment.

FIGS. 13A-C show a portion of a prototype top housing 120 including a partially-extending recess positioned to allow a greater range of motion of a jaw member, in accordance with one exemplary embodiment. FIG. 13A shows the jaw member at an intermediate location. FIG. 13B shows the jaw member substantially at the position it would occupy at the maximum outward position if the raised outer periphery did not include a recess. FIG. 13C shows the jaw member at its increased maximum outward position due to the existence of the recess. As can be seen, without increasing the overall size of the container gripping device compared to the container gripping devices shown in FIGS. 1-11, the device represented in FIGS. 13A-C can accommodate larger containers due to the existence of the recess. Alternatively, for a given maximum outward jaw member position (e.g., the position of the jaw member in FIG. 13B as representing the maximum outward position), the overall size of the container gripping device can be reduced due to the existence of the recess, e.g., as depicted in FIG. 14, which shows the original outer wall 1410 of the original container gripping device and a theoretical outer wall 1420 of a reduced size container gripping device having a recess 1430.

In any of the embodiments described herein, one or more surfaces of the raised outer periphery may include grip-enhancing features in order to enhance the ability of the user to grip the raised outer periphery and rotate the top housing. Such grip-enhancing features may include, for example, raised or recessed structures (e.g., a hatched surface) or a grip-enhancing material (e.g., rubber).

In any of the embodiments described herein, the resilient members 146 on the jaw members 140 may include grip-enhancing features in order to enhance the ability of the jaw members 140 to grip the container. For example, the resilient members 146 may include ripples. It is expected that ripples would require less effort to tighten, where even a little tightening would compress the ripples and the motion of the container during opening would attempt to lift the ripples and consequently would create further friction. Other grip-enhancing features may include such things as suction cups, washable adhesive gel tape, or other grip-enhancing features or materials.

Each jaw member 140 of the exemplary embodiments shown and described above with reference to FIGS. 1-11 includes a top portion 142 that is wider than the slot 150 and that rides along the top surface of the top housing 120 as the jaw member 140 moves along the slot 150, with the ridge 147 sitting within the slot 150 to facilitate the interaction of the jaw member 140 with the slot 150. To secure the jaw member 140 to the top housing 120, the ridge 147 may include one or more threaded holes 149 in which a screw 148 (FIG. 3) may be threaded. In this way, as the jaw member 140 moves along the slot 150, the top portion 142 rides along the top surface of the top housing 120 while the screw(s) 148 ride along the bottom surface of the top housing 120, thereby essentially "sandwiching" the top surface of the top housing 120 between the top portion 142 of the jaw member 140 and the screw(s) 148. In order to prevent binding of the jaw member 140 to the top housing 120, the screw(s) 148 may be left loose enough such that it does not bind the jaw member 140 to the top housing 120 and prevent the jaw member 140 from sliding.

Figure 15:
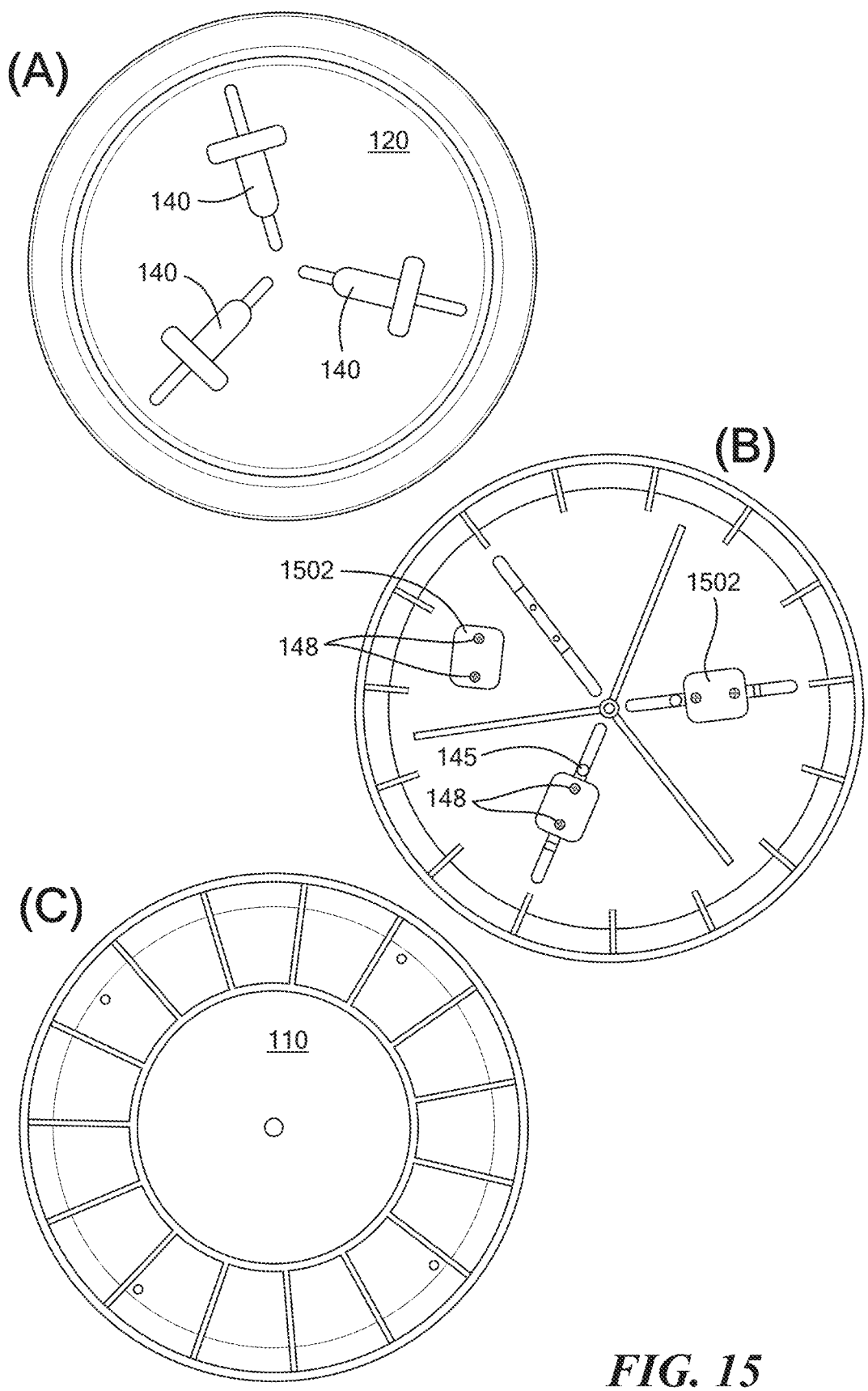
FIG. 15 is an annotated photograph showing an exemplary embodiment in which each jaw member is secured to the ridge using a back plate attached by two screws, in accordance with one exemplary embodiment.

Therefore, in certain alternative embodiments, a back plate is secured to the ridge 147 using screws 148 such that the back plate, rather than the screw(s) 148, ride along the bottom surface of the top housing 120. FIG. 15 shows an exemplary embodiment in which each jaw member 140 is secured to the ridge 147 using a back plate 1502 attached by two screws 148, although it should be noted that the back plate 1502 could be attached in other ways or could be integral with the ridge 147. FIG. 15B is a bottom view of the top housing 120 with the jaw members 140 secured using back plates 1502. FIG. 15A is a top view of the top housing 120 with the jaw members 140 secured using back plates 1502. FIG. 15C is a top view of base 110. Generally speaking, the back plates 1502 slide more smoothly along the bottom surface of the top housing 120 than screws 148 alone. Although the post member 145 separate from the back plate 1502 in this exemplary embodiment (e.g., attached to or integral with the ridge 147), in certain alternative embodiments, the post member 145 could be on the back plate 1502.

The inventor has found that in embodiments of the types shown and described above with reference to FIGS. 1-11 and 15, the forces placed on the jaw members 140 during tightening onto the container can cause the jaw members 140 to place out-of-plane forces on the top of the top housing 120 at locations where the top surface of the top housing 120 is sandwiched between the top portion 142 of the jaw member 140 and the screw(s) 148 or back plates 1502. Specifically, the portion of the jaw member 140 at the engagement face 144 end is forced downward while the opposite end of the jaw member 140 is forced upward. Among other things, such out-of-plane forces could hinder the motion of the jaw member 140 within the slot 150 and in extreme cases could cause the top surface of the top housing 120 to crack or require a thicker top housing 120 in order to prevent such cracking.

Figure 16:
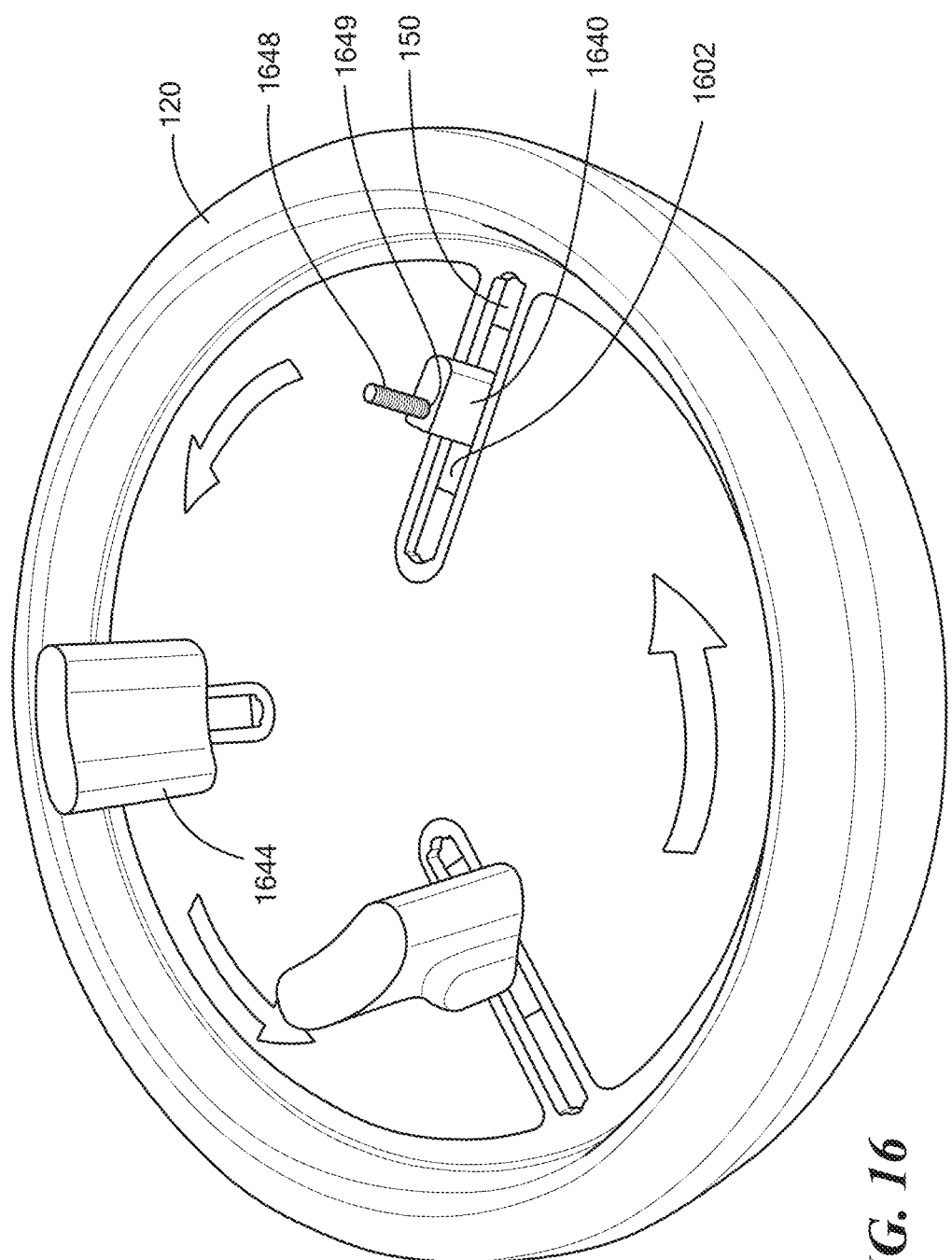
FIG. 16 is an annotated photograph showing the top portion of an alternative jaw member lacking a wide top portion and protruding through the slot in the top housing, in accordance with one exemplary embodiment.

Therefore, certain alternative embodiments omit the wide top portion 142 that rides along the top surface of the top housing 120 as the jaw member 140 moves along the slot 150. FIG. 16 shows the top portion of an alternative jaw member 1640 lacking a wide top portion and protruding through the slot 150 in the top housing 120, in accordance with one exemplary embodiment. In this exemplary embodiment, the alternative jaw member 1640 includes an integral back plate 1602 to secure the alternative jaw member 1640 in the top housing 120, although the alternative jaw member 1640 can be secured in the top housing 120 in other ways, e.g., using screws or a separate back plate as in some of the exemplary embodiments described above. Generally speaking, this alternative jaw member 1640 is easier to install in the top housing 120 than the jaw member 140 with wide top portion 142.

The alternative jaw member 1640 is configured to hold a separate engagement face assembly 1644. In this exemplary embodiment, the engagement face assembly 1644 includes an engagement face body and an engagement face cover (discussed in greater detail below). In FIG. 16, only the engagement face cover is visible, since the engagement face cover completely covers the engagement face body in this exemplary embodiment. In this exemplary embodiment, the engagement face assembly 1644 is attached to the alternative jaw member 1640 using a screw 1648 that passes up through a hole 1649 in the alternative jaw member 1640 and into a threaded slot in the engagement face body, although the engagement face assembly 1644 can be attached to the alternative jaw member 1640 in other ways. Other engagement face assembly 1644 types and configurations are possible.

Figure 17:
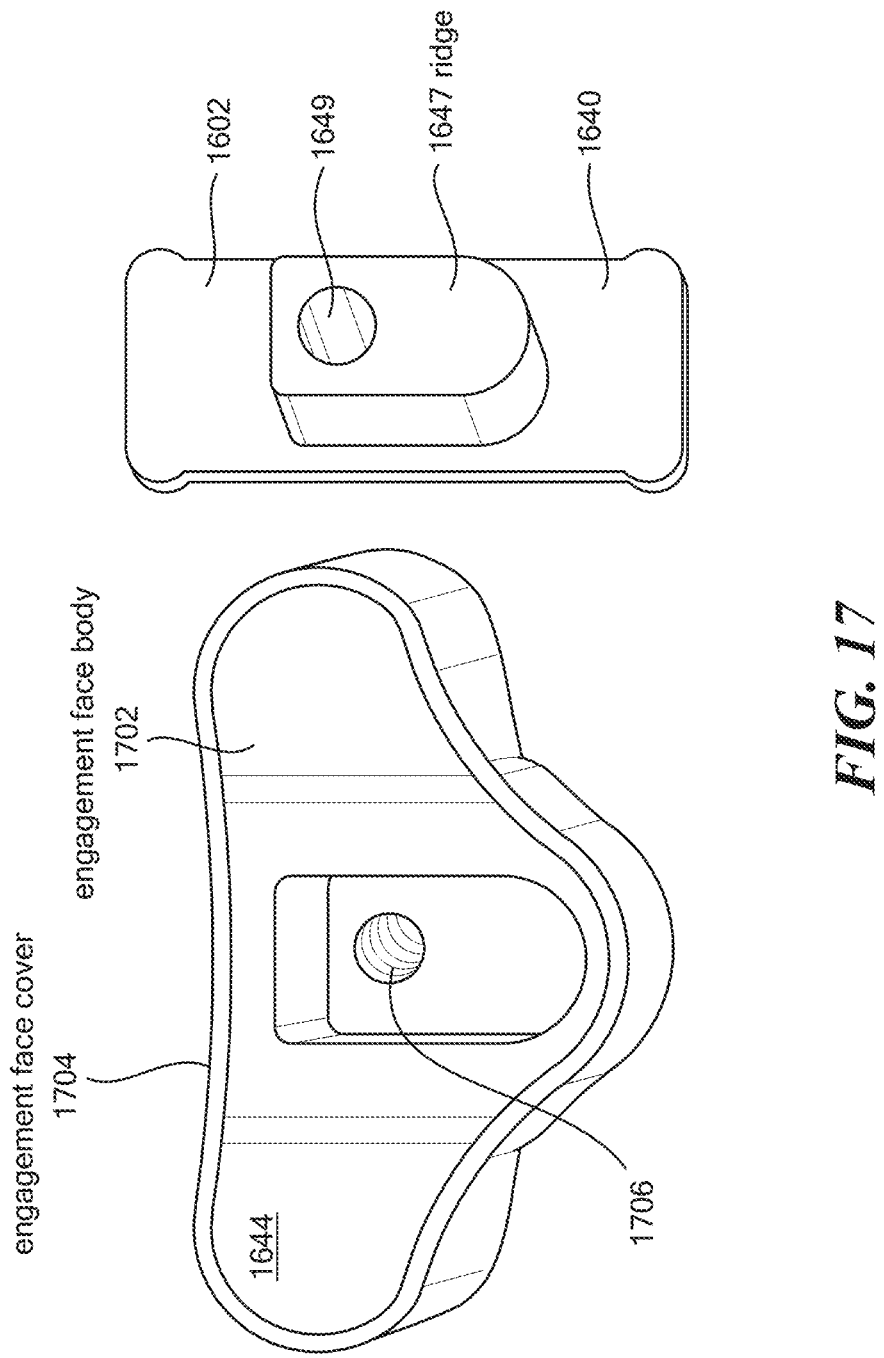
FIG. 17 is an annotated photograph showing a top perspective view of the alternative jaw member of FIG. 16 including integral back plate and hole as well as a bottom perspective view of the engagement face assembly including the engagement face cover installed over the engagement face body, in accordance with one exemplary embodiment.

FIG. 17 shows a top perspective view of the alternative jaw member 1640 including integral back plate 1602 and hole 1649 as well as a bottom perspective view of the engagement face assembly 1644 including the engagement face cover 1704 installed over the engagement face body 1702, in accordance with one exemplary embodiment. As can be seen, in this exemplary embodiment, the ridge 1647 of the alternative jaw member 1640 fits into a corresponding slot in the bottom of the engagement face body 1702 such that the hole 1649 through the alternative jaw member 1640 aligns with the corresponding threaded slot 1706 in the engagement face body 1702. Without limitation, the elongated shape of the ridge 1647 helps to prevent or reduce twisting of the alternative jaw member 1640 within the slot 150 and also helps to prevent or reduce twisting of the engagement face assembly 1644 on the alternative jaw member 1640. It should be noted that other ridge 1647 shapes/configurations can provide similar connectivity and twist reduction properties, e.g., using two separate ridges spaced apart from one another.

Figure 18:
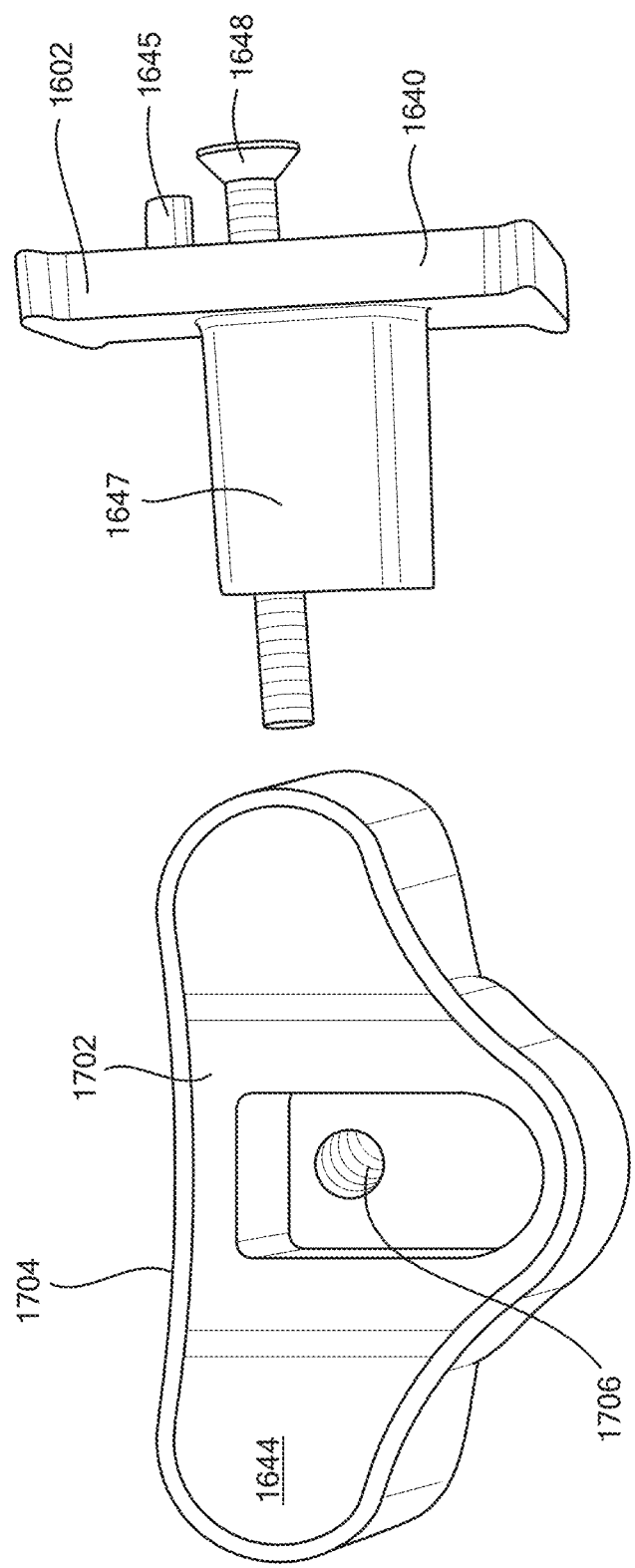
FIG. 18 is an annotated photograph showing a side perspective view of the alternative jaw member of FIG. 16 including integral back plate and screw passing through hole as well as a bottom perspective view of the engagement face assembly including the engagement face cover installed over the engagement face body, in accordance with one exemplary embodiment.

FIG. 18 shows a side perspective view of the alternative jaw member 1640 including integral back plate 1602 and screw 1649 passing through hole 1649 as well as a bottom perspective view of the engagement face assembly 1644 including the engagement face cover 1704 installed over the engagement face body 1702, in accordance with one exemplary embodiment.

Figure 19:
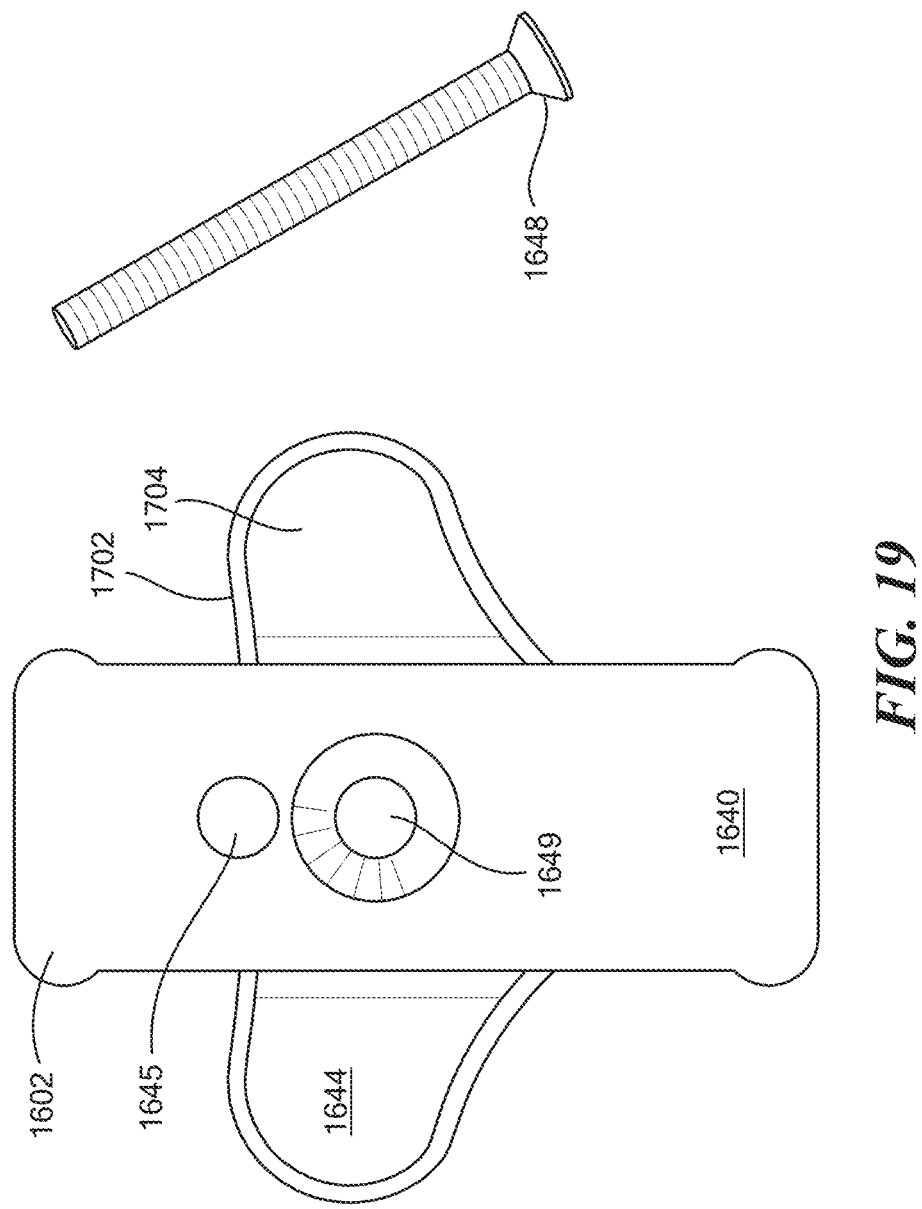
FIG. 19 is an annotated photograph showing a bottom view of the alternative jaw member of FIG. 16 inserted into the engagement face assembly prior to securing the two pieces together using the screw, in accordance with one exemplary embodiment.

FIG. 19 shows a bottom view of the alternative jaw member 1640 inserted into the engagement face assembly 1644 prior to securing the two pieces together using the screw 1648, in accordance with one exemplary embodiment.

Figure 20:
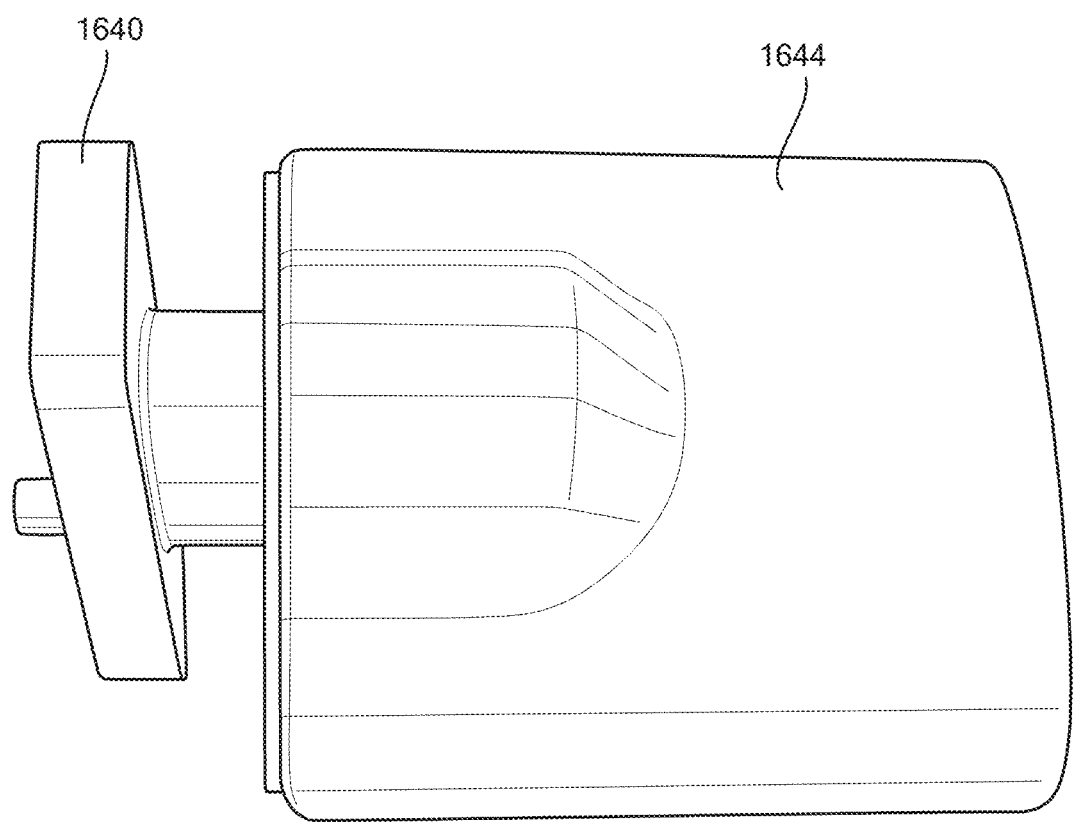
FIG. 20 is an annotated photograph showing a back perspective view of the configuration shown in FIG. 19 having the alternative jaw member inserted into the engagement face assembly.

FIG. 20 shows a back perspective view of the configuration shown in FIG. 19 having the alternative jaw member 1640 inserted into the engagement face assembly 1644.

Figure 21:
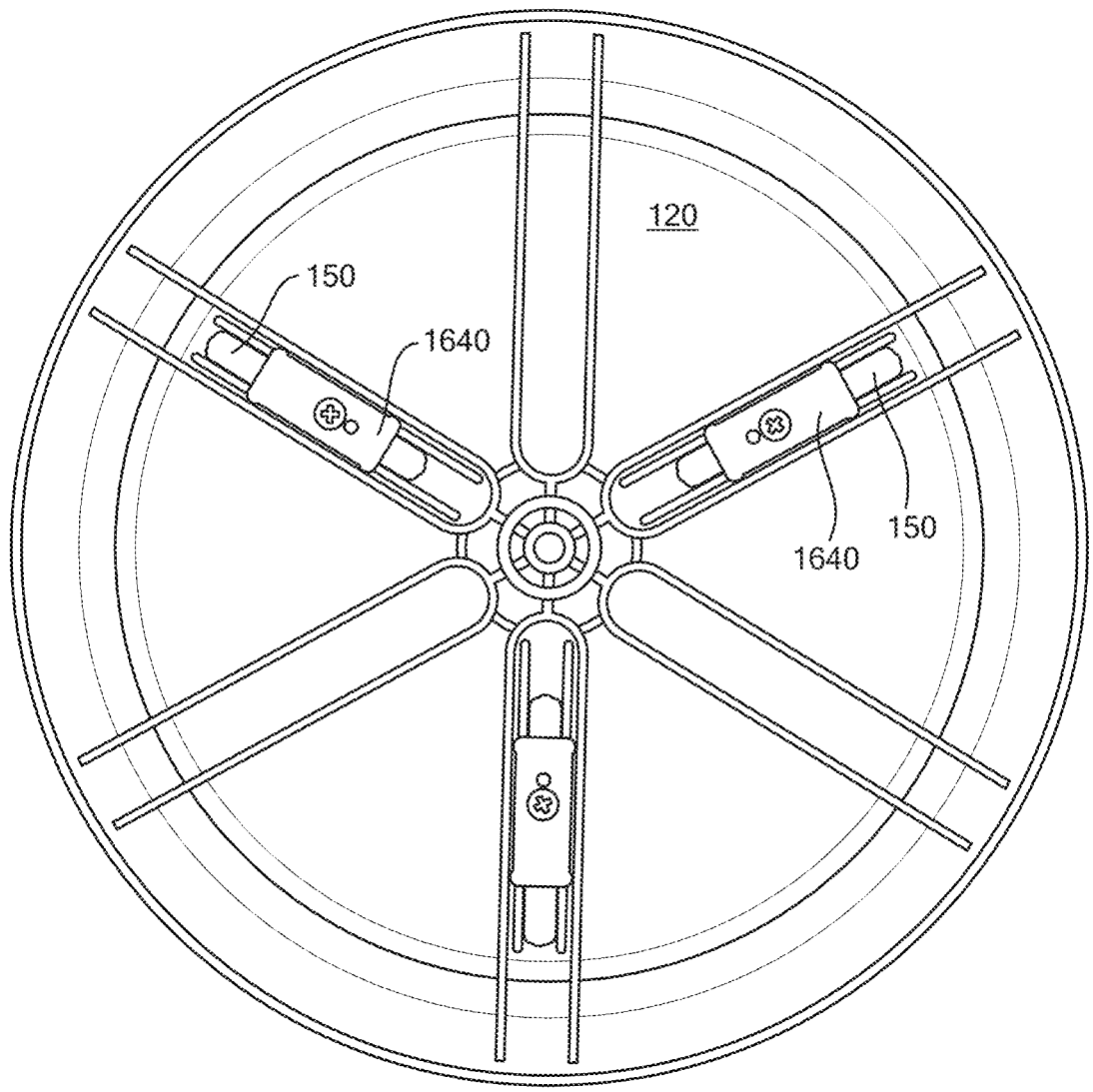
FIG. 21 is an annotated photograph showing a bottom view of the top housing with two alternative jaw members installed in respective slots, in accordance with one exemplary embodiment.

FIG. 21 shows a bottom view of the top housing 120 with two alternative jaw members 1640 installed in respective slots 150, in accordance with one exemplary embodiment.

Figure 22:
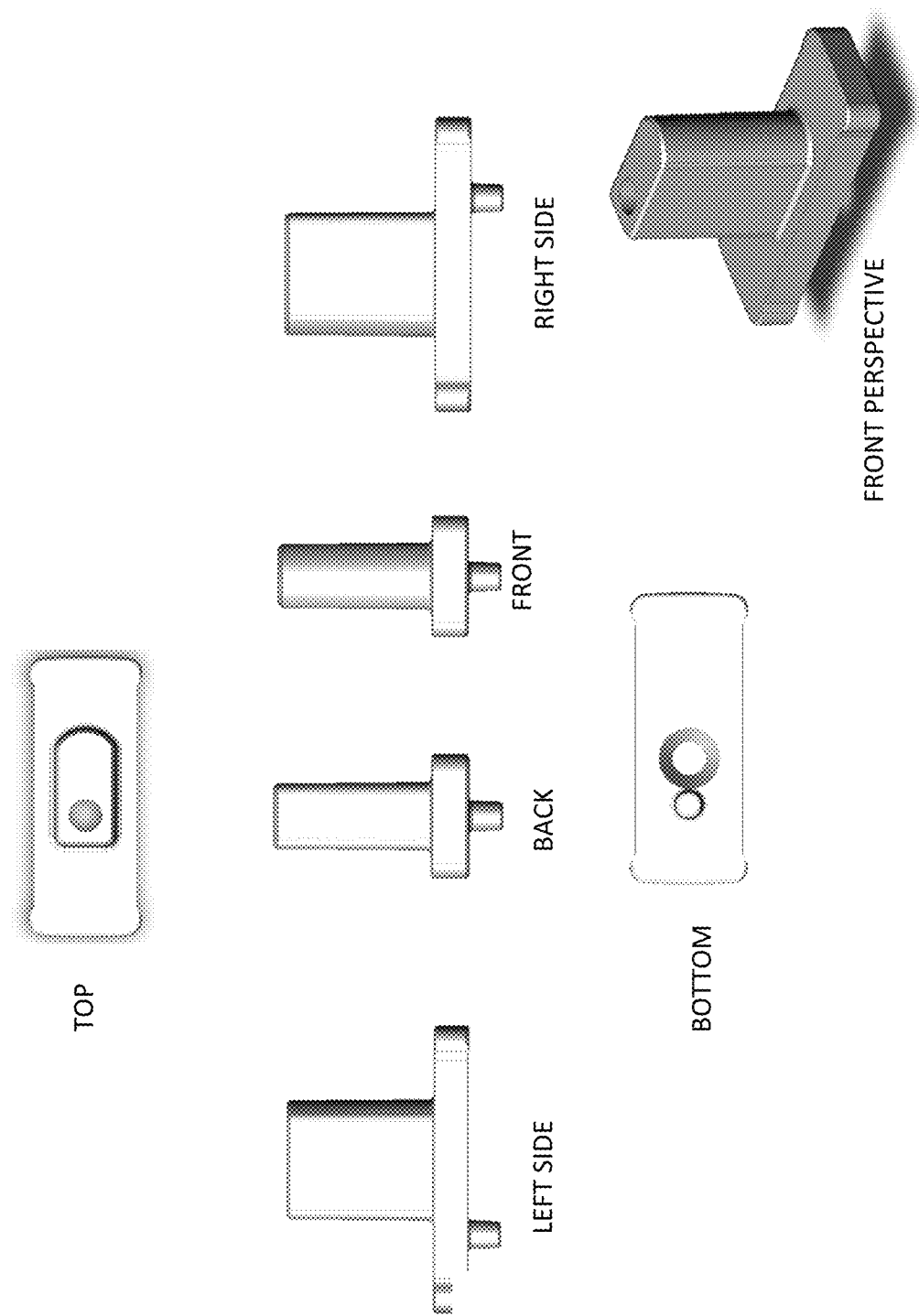
FIG. 22 is a schematic diagram showing top, left side, back, front, right side, bottom, and front perspective views of the alternative jaw member in accordance with the embodiments described above.

FIG. 22 shows top, left side, back, front, right side, bottom, and front perspective views of the alternative jaw member 1640 in accordance with the embodiments described above.

Figure 23:
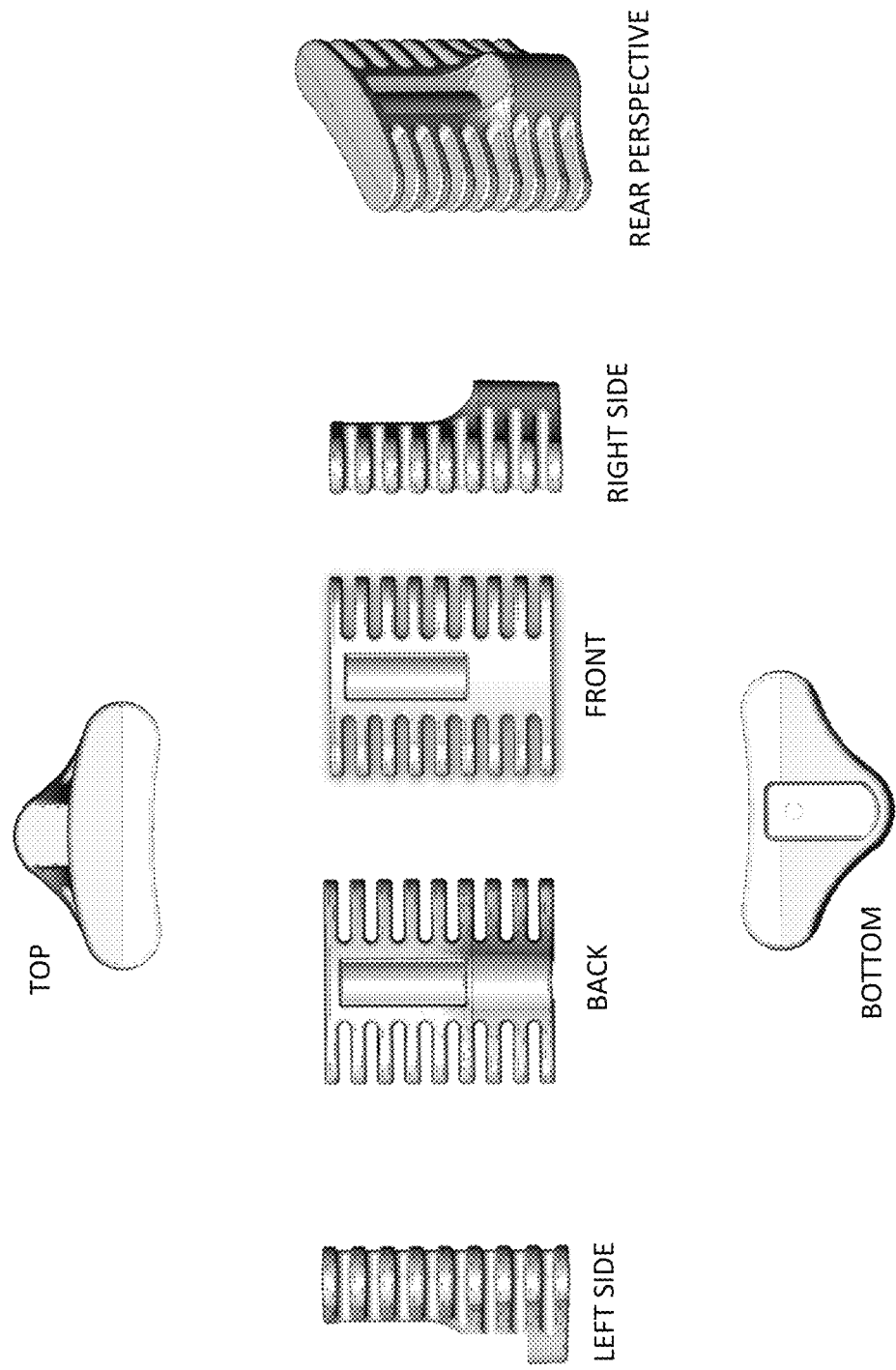
FIG. 23 is a schematic diagram showing top, left side, back, front, right side, bottom, and front perspective views of the engagement face body in accordance with the embodiments described above.

FIG. 23 shows top, left side, back, front, right side, bottom, and front perspective views of the engagement face body 1702 in accordance with the embodiments described above.

Figure 24:
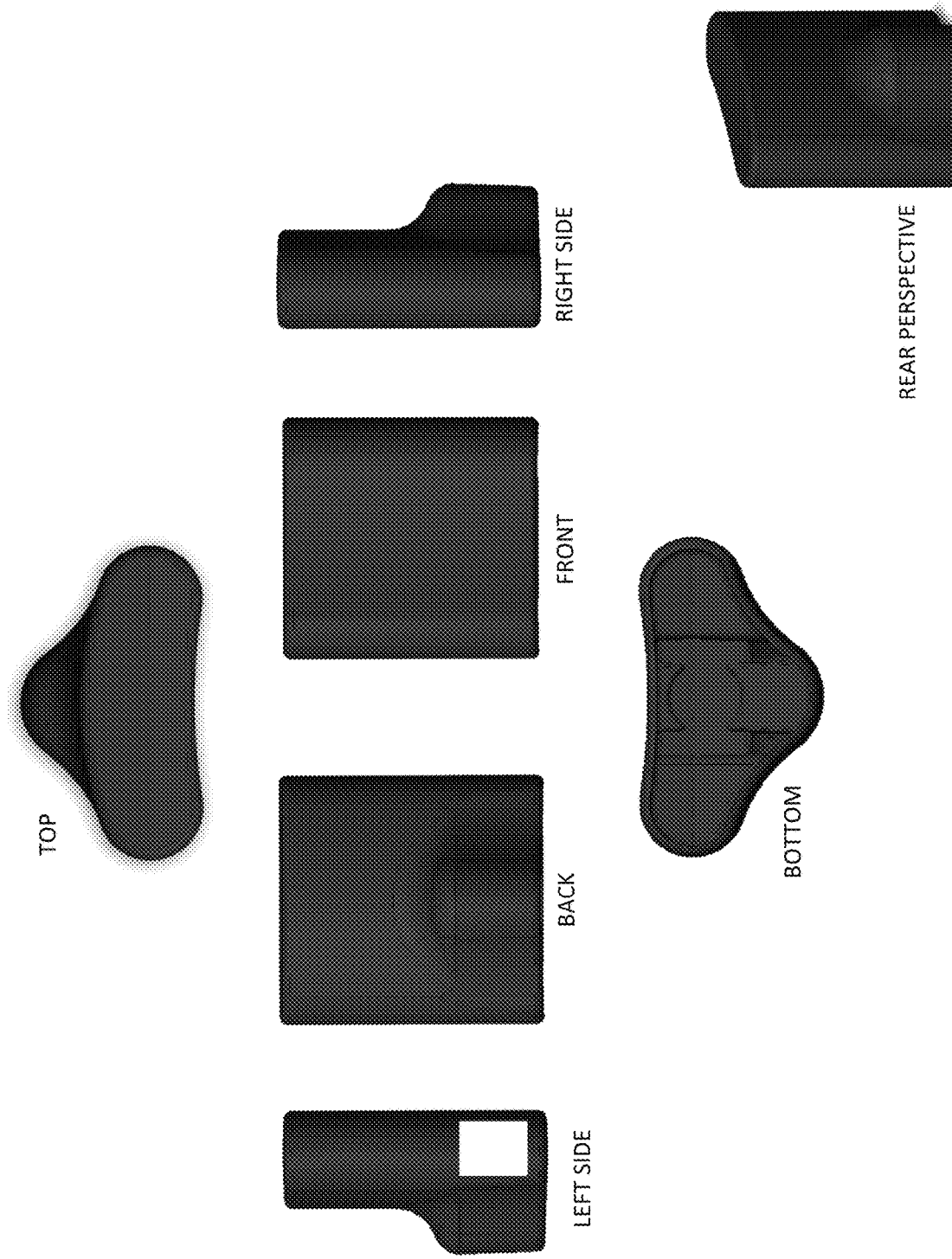
FIG. 24 is a schematic diagram showing top, left side, back, front, right side, bottom, and front perspective views of the engagement face cover in accordance with the embodiments described above.

FIG. 24 shows top, left side, back, front, right side, bottom, and front perspective views of the engagement face cover 1704 in accordance with the embodiments described above.

As in the exemplary embodiments described above, the forces placed on the alternative jaw members 1640 during tightening onto the container can cause the alternative jaw members 1640 to deflect, although, without the wide top portion 142, the alternative jaw members 1640 generally can deflect without or before placing undue stress and strain on the top housing 120. The inventor therefore considers exemplary embodiments with the alternative jaw members 1640 to have certain benefits over the prior embodiments having the wide top portion 142, both for ease of installation and for resilience of the overall product.

Still, these deflections of the alternative jaw members 1640 can place a downward force on the spiral guide member 160 and can place an upward force on the bottom surface of the top housing 120, which in turn can cause some separation between the top housing 120 and the base 110 in some cases. In extreme cases, these deflections could pop the post member 1645 of an alternative jaw member 1640 out of the spiral shaped guide channel 162/164/166 or even crack the top housing 120 or the spiral guide member 160, although the chances of incurring such damage are much less likely than in the previous embodiments having the wide top portion 142.

Thus, in certain exemplary embodiments, the engagement face assembly 1644 is configured to be wider than the slot 150 and to rest slightly above the top surface of the top housing 120 (e.g., by between 0.01-0.25 inches) so as to act as a "stop" or bumper in the event of excessive deflection of the alternative jaw member 1640, without the engagement face assembly 1644 sliding along the top surface of the top housing 120 during normal operation. In certain exemplary embodiments, the engagement face cover is made of a resilient material, which can provide some additional protection in the event the engagement face assembly 1644 is called upon to act as a "stop" or bumper, providing some "give" if needed rather that acting as a rigid stop.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. An apparatus for gripping a container, the apparatus comprising:
   a base element configured for stationary placement on an underlying surface;
   a top housing rotatably secured to the base element and configured for rotation about a central axis with respect to the base element, the top housing having a container support surface facing upward relative to the underlying surface, the container support surface configured to receive an underside of the container in abutment thereto;

wherein the top housing includes a circular raised rim extending above the upward-facing container support surface, the circular raised rim having (i) a center that is coincident with the central axis, (ii) an exterior wall defining a periphery of the top housing, and (iii) an interior wall defining a physical limit for a radial dimension of the container, wherein the circular raised rim provides a physical feature configured to facilitate manually gripping of the feature, for use in rotating the top housing about the central axis relative to the base unit;

a plurality of movable jaw members movably secured to the top housing in a manner to support movement thereof in radially inward and radially outward directions, such radial movement experiencing an outward physical limit defined by the interior wall in the absence of an accommodation for this limit, each movable jaw member including a container-engaging element above the upward-facing container support surface for engaging a container placed on the upward-facing container support surface;

a rotation-to-translation conversion mechanism, mounted beneath the top housing, coupled to the movable jaw members, and configured to cause radially outward movement of the movable jaw members when the top housing is rotated in a first direction relative to the base element and to cause radially inward movement of the movable jaw members when the top housing is rotated in a second direction relative to the base element;

wherein the raised rim has a set of radially disposed recesses, the set of recesses including a recess corresponding to each one of the movable jaw members and extending at least partially through the raised rim, each such corresponding recess configured to provide an accommodation for radial movement of the corresponding jaw member beyond the outward physical limit defined by the interior wall so as to accommodate a container having a greater radial dimension than would be possible in the absence of the set of recesses, wherein at least one recess of the set of recesses is configured to provide for enhanced gripping therein by at least one of the user's fingers for rotating the top housing.

2. A container gripping apparatus according to claim 1, wherein the at least one recess extends fully through the raised outer periphery.

3. A container gripping apparatus according to claim 1, comprising a plurality of movable jaw members and a corresponding plurality of recesses.

4. A container gripping apparatus according to claim 1, wherein the rotation-to-translation conversion mechanism includes a spiral guide element located between the base element and the top housing, the spiral guide element including at least one spiral groove, each movable jaw member having a protrusion located within the at least one spiral groove and configured to move along the at least one spiral groove when the top housing is rotated so as to cause the radial movement of the movable jaw members.

5. A container gripping apparatus according to claim 4, wherein each jaw member includes a body portion, the protrusion extending from a bottom of the body portion.

6. A container gripping apparatus according to claim 4, wherein the spiral element includes an opening extending there through, the top housing having a protrusion extending downward and through the opening, thereby allowing the top housing to rotate about the axis and with respect to the spiral guide element and the base member.

7. A container gripping apparatus according to claim 4, wherein the top housing includes, for each movable jaw member, a slot extending through the top housing, each of the protrusions extending through a slot and into the at least one spiral groove.

8. A container gripping apparatus according to claim 4, wherein the at least one spiral groove includes a plurality of spiral grooves, the protrusion from each of a plurality of jaw members located in a dedicated spiral groove.

9. A container gripping apparatus according to claim 1, further comprising: at least one leg member extending downwardly from the base element and configured to engage an edge of the surface during rotation of the top housing.

10. A container gripping apparatus according to claim 1, wherein each jaw member includes a resilient member for grasping a container.

11. A container gripping apparatus according to claim 1, wherein the first direction moving the at least one jaw member outward is clockwise.

12. A container gripping apparatus according to claim 1, further comprising: a brace member removably secured to the base element, the brace member including a horizontal portion configured to rest on the surface and a vertical portion configured to engage the edge of the surface, thereby preventing rotation of the device during use.

13. A container gripping apparatus according to claim 12, wherein the brace member further includes a hinge between the horizontal portion and the vertical portion, the hinge configured to allow the horizontal portion and vertical portion to move relative to one another.

14. A container gripping apparatus according to claim 1, wherein the top housing comprises, for each movable jaw member, a slot in which the jaw member slides, each movable jaw member comprising: a ridge configured to reside within the slot; a top plate wider than the slot and coupled directly or indirectly to the ridge and configured to slide along a top surface of the top housing about the slot; and a bottom plate wider than the slot and coupled directly or indirectly to the ridge and configured to slide along a bottom surface of the top housing about the slot.

15. A container gripping apparatus according to claim 14, wherein the bottom plate is attached to the jaw member using at least one fastener such that the jaw member can be positioned within the slot from the top surface of the slot with the top plate on the top surface of the slot and then secured within the slot by attaching the bottom plate using the at least one fastener.

16. A container gripping apparatus according to claim 1, wherein the top housing comprises, for each movable jaw member, a slot in which the jaw member slides, each movable jaw member comprising: a ridge configured to reside within the slot; and a bottom plate wider than the slot and coupled directly or indirectly to the ridge and configured to slide along a bottom surface of the top housing about the slot; and a post member coupled directly or indirectly to the ridge on a bottom of the jaw member and configured to engage with a spiral shaped guide channel of the container gripping apparatus to slide the jaw member within the slot, the jaw member lacking a top plate that slides along a top surface of the top housing about the slot such that the jaw member can be positioned within the slot from the bottom of the top housing and held within the container gripping apparatus by the post member in the spiral shaped guide and the bottom plate.

17. A container gripping apparatus according to claim 16, further comprising: an engagement face assembly attached to the ridge and including a rigid engagement face body and a resilient engagement face cover disposed over the engagement face body.

18. A container gripping apparatus according to claim 17, wherein the engagement face assembly is attached using a screw that passes from the bottom of the ridge through a hole in the ridge into a threaded slot in the engagement face assembly.

19. A container gripping apparatus according to claim 17, wherein the engagement face assembly is configured to be wider than the slot and to rest above the top surface of the slot so as to act as a "stop" or bumper in the event of excessive deflection of the jaw member, without the engagement face assembly sliding along the top surface of the slot during normal operation.

\* \* \* \* \*